United States Patent
Kendrick et al.

(10) Patent No.: US 8,490,375 B2
(45) Date of Patent: Jul. 23, 2013

(54) BALER COLLECTOR FOR COLLECTING BIOMASS FROM A COMBINE HARVESTER

(75) Inventors: Patrick Kendrick, Hesston, KS (US); Kevin Tacke, Hesston, KS (US); Allen J. Kuhn, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/644,643

(22) Filed: Dec. 22, 2009

(65) Prior Publication Data

US 2011/0023437 A1 Feb. 3, 2011

Related U.S. Application Data

(60) Provisional application No. 61/230,381, filed on Jul. 31, 2009.

(51) Int. Cl.
| | |
|---|---|
| *A01D 39/00* | (2006.01) |
| *A01D 43/02* | (2006.01) |
| *A01D 75/00* | (2006.01) |

(52) U.S. Cl.
USPC .......................................................... 56/341

(58) Field of Classification Search
USPC ................ 56/341; 100/88; 460/114, 96, 111, 460/112; 53/587, 504
See application file for complete search history.

(56) References Cited

U.S. PATENT DOCUMENTS

| | | | |
|---|---|---|---|
| 1,980,027 A * | 11/1934 | Adams ............................ 56/122 |
| 2,030,031 A * | 2/1936 | Innes ................................. 100/4 |
| 2,080,031 A | 5/1937 | Devereux |
| 2,180,852 A * | 11/1939 | Bussell ............................ 100/44 |
| 2,953,885 A | 9/1960 | Richey et al. |
| 3,242,658 A * | 3/1966 | Morales ......................... 56/13.4 |
| 3,317,064 A * | 5/1967 | Fingerut ......................... 406/41 |
| 3,421,780 A | 1/1969 | Rimmey |
| 3,518,820 A | 7/1970 | Yeske |
| 3,552,109 A | 1/1971 | Murray et al. |
| 3,680,291 A * | 8/1972 | Soteropulos ................... 56/14.3 |
| 3,705,483 A * | 12/1972 | Jarrell et al. ................... 56/13.5 |
| 3,721,075 A * | 3/1973 | Weiberg ......................... 56/13.5 |
| 3,832,837 A | 9/1974 | Burkhart et al. |
| 3,841,415 A | 10/1974 | Koenig et al. |
| 3,860,010 A * | 1/1975 | Anderson et al. ............. 460/111 |
| 3,868,811 A | 3/1975 | Cicci et al. |
| 3,926,319 A | 12/1975 | Neely et al. |
| 3,952,889 A * | 4/1976 | Wanker et al. ................. 406/39 |
| 3,955,492 A * | 5/1976 | Topolay ........................ 100/215 |
| 4,024,804 A | 5/1977 | Hanson et al. |
| 4,057,954 A | 11/1977 | Mast |
| 4,065,914 A | 1/1978 | Phillips et al. |

(Continued)

FOREIGN PATENT DOCUMENTS

| | | |
|---|---|---|
| CA | 1001423 A1 | 12/1976 |
| DE | 3248066 A1 | 6/1984 |

(Continued)

OTHER PUBLICATIONS

International Search Report for International Application No. PCT/IB2010/001776 Dated Oct. 29, 2010.

(Continued)

*Primary Examiner* — Árpád Fábián-Kovács

(57) ABSTRACT

A collector coupled to a baler defining a target for receiving crop material projected toward the baler from a combine harvester.

13 Claims, 27 Drawing Sheets

U.S. PATENT DOCUMENTS

| | | | |
|---|---|---|---|
| 4,077,315 | A | 3/1978 | Meiers et al. |
| 4,092,914 | A | 6/1978 | Burrough et al. |
| 4,117,775 | A | 10/1978 | White et al. |
| 4,121,778 | A * | 10/1978 | Quick ............................ 241/79 |
| 4,135,444 | A | 1/1979 | White et al. |
| 4,169,347 | A | 10/1979 | Phillips |
| 4,173,352 | A | 11/1979 | van der Lely |
| 4,195,958 | A * | 4/1980 | Vahlkamp et al. ............ 414/24.6 |
| 4,199,923 | A * | 4/1980 | Blake ............................. 56/14.5 |
| 4,229,934 | A | 10/1980 | Berky et al. |
| 4,319,446 | A | 3/1982 | Arnold et al. |
| 4,352,267 | A | 10/1982 | Mellinger |
| 4,433,533 | A | 2/1984 | Giani |
| 4,510,861 | A | 4/1985 | Campbell et al. |
| 4,514,969 | A | 5/1985 | Moosbrucker et al. |
| 4,549,481 | A | 10/1985 | Groeneveld et al. |
| 4,558,560 | A | 12/1985 | Koch |
| 4,580,398 | A | 4/1986 | Bruer |
| 4,656,812 | A | 4/1987 | Busse et al. |
| 4,686,812 | A | 8/1987 | Bruer et al. |
| 4,686,820 | A * | 8/1987 | Andra et al. .................... 56/341 |
| 4,731,984 | A | 3/1988 | Van Der Lely et al. |
| 4,748,801 | A | 6/1988 | Sheehan et al. |
| 4,773,666 | A | 9/1988 | Koberlein et al. |
| 4,838,015 | A | 6/1989 | Mouret et al. |
| 4,850,271 | A | 7/1989 | White et al. |
| 4,914,900 | A | 4/1990 | Viaud |
| 4,943,260 | A * | 7/1990 | Fossum ............................ 460/96 |
| 4,995,216 | A | 2/1991 | Vansteelant et al. |
| 5,042,973 | A | 8/1991 | Hammarstrand |
| 5,115,734 | A | 5/1992 | Quartaert |
| 5,165,333 | A | 11/1992 | Ratzlaff et al. |
| 5,220,772 | A | 6/1993 | Koskela et al. |
| 5,255,501 | A * | 10/1993 | McWilliams .................... 56/341 |
| 5,388,504 | A | 2/1995 | Kluver et al. |
| 5,467,702 | A | 11/1995 | Naaktgeboren et al. |
| 5,557,859 | A | 9/1996 | Baron |
| 5,575,316 | A | 11/1996 | Pollklas |
| 5,661,961 | A | 9/1997 | Westhoff et al. |
| 5,666,793 | A | 9/1997 | Bottinger |
| 5,729,953 | A | 3/1998 | Fell et al. |
| 5,749,783 | A | 5/1998 | Pollklas et al. |
| 5,752,374 | A * | 5/1998 | Allworden et al. .............. 56/341 |
| 5,768,872 | A | 6/1998 | Von Allworden et al. |
| 5,926,178 | A | 7/1999 | Kurtenbach et al. |
| 5,941,768 | A * | 8/1999 | Flamme ........................ 460/114 |
| 5,979,153 | A | 11/1999 | Roth |
| 5,984,019 | A | 11/1999 | Hund et al. |
| 6,032,446 | A | 3/2000 | Gola et al. |
| 6,119,789 | A | 9/2000 | Taylor |
| 6,125,775 | A | 10/2000 | Gust |
| 6,161,368 | A | 12/2000 | Wilkens |
| 6,263,650 | B1 | 7/2001 | Deutsch et al. |
| 6,272,825 | B1 | 8/2001 | Anderson et al. |
| 6,385,952 | B1 | 5/2002 | Bergkamp et al. |
| 6,421,992 | B1 | 7/2002 | Goering |
| 6,421,996 | B1 * | 7/2002 | Deutsch et al. .................. 56/341 |
| 6,467,237 | B2 | 10/2002 | Viaud |
| 6,474,228 | B1 | 11/2002 | Leupe et al. |
| 6,511,374 | B2 | 1/2003 | VanEe |
| 6,546,705 | B2 | 4/2003 | Scarlett et al. |
| 6,581,364 | B2 | 6/2003 | Lucand et al. |
| 6,587,772 | B2 | 7/2003 | Behnke |
| 6,622,455 | B2 | 9/2003 | Davis et al. |
| 6,644,006 | B1 | 11/2003 | Merritt et al. |
| 6,675,561 | B2 | 1/2004 | Davis et al. |
| 6,682,416 | B2 | 1/2004 | Behnke et al. |
| 6,692,351 | B2 | 2/2004 | Johnson et al. |
| 6,711,884 | B1 | 3/2004 | McLeod et al. |
| 6,729,118 | B2 | 5/2004 | Viaud |
| 6,729,951 | B2 | 5/2004 | Hoskinson et al. |
| 6,736,721 | B2 | 5/2004 | Niermann et al. |
| 6,829,879 | B2 | 12/2004 | Weichholdt |
| 6,874,311 | B2 | 4/2005 | Lucand et al. |
| 6,874,412 | B1 | 4/2005 | Glaszcz |
| 6,915,736 | B2 | 7/2005 | Leupe |
| 7,003,933 | B2 * | 2/2006 | Fukumori et al. .............. 53/504 |
| 7,051,501 | B2 | 5/2006 | Schlesser |
| 7,051,651 | B2 | 5/2006 | McDowell |
| 7,086,942 | B2 | 8/2006 | Niermann et al. |
| 7,222,566 | B2 | 5/2007 | Biziorek et al. |
| 7,261,633 | B2 | 8/2007 | Benes |
| 7,287,365 | B2 | 10/2007 | Dubois |
| 7,331,168 | B2 | 2/2008 | Dubois |
| 7,337,713 | B1 | 3/2008 | Olander et al. |
| 7,409,814 | B2 | 8/2008 | Hood et al. |
| 7,448,196 | B2 | 11/2008 | Schrag et al. |
| 7,467,997 | B2 | 12/2008 | Niermann et al. |
| 7,485,035 | B1 | 2/2009 | Yde |
| 7,490,544 | B1 | 2/2009 | Bollinger et al. |
| 7,544,126 | B2 | 6/2009 | Lauer et al. |
| 7,553,225 | B2 | 6/2009 | Benes |
| 7,681,382 | B2 | 3/2010 | Viaud |
| 7,721,516 | B2 * | 5/2010 | Wendling .................. 56/10.2 A |
| 7,756,623 | B2 | 7/2010 | Jarrett et al. |
| 7,798,894 | B2 * | 9/2010 | Isfort ............................ 460/114 |
| 7,818,954 | B2 * | 10/2010 | Rempe et al. ................... 56/341 |
| 7,837,542 | B1 * | 11/2010 | Ricketts et al. .................. 460/99 |
| 7,862,068 | B2 | 1/2011 | Schlesser et al. |
| 7,904,485 | B2 | 3/2011 | Bull et al. |
| 7,937,923 | B2 | 5/2011 | Biziorek et al. |
| 7,988,080 | B2 | 8/2011 | Benes et al. |
| 2001/0013214 | A1 | 8/2001 | Viaud |
| 2001/0042362 | A1 | 11/2001 | Scarlett et al. |
| 2002/0004417 | A1 | 1/2002 | Redekop |
| 2002/0073677 | A1 | 6/2002 | Lucand et al. |
| 2002/0083695 | A1 | 7/2002 | Behnke et al. |
| 2002/0108508 | A1 | 8/2002 | Leupe et al. |
| 2002/0119809 | A1 | 8/2002 | Bognar et al. |
| 2003/0093979 | A1 * | 5/2003 | Fukumori et al. .............. 53/587 |
| 2003/0115841 | A1 | 6/2003 | Davis et al. |
| 2003/0186730 | A1 | 10/2003 | Hoskinson et al. |
| 2003/0217539 | A1 | 11/2003 | Grossjohann |
| 2004/0029624 | A1 | 2/2004 | Weichholdt |
| 2004/0083905 | A1 | 5/2004 | Viaud |
| 2004/0173435 | A1 | 9/2004 | Vogelgesang |
| 2004/0217645 | A1 | 11/2004 | Ponet et al. |
| 2004/0242291 | A1 | 12/2004 | Weichholdt |
| 2004/0261389 | A1 * | 12/2004 | Shields ........................... 56/153 |
| 2005/0003876 | A1 | 1/2005 | Kuhn et al. |
| 2005/0086921 | A1 * | 4/2005 | Bares et al. ....................... 56/28 |
| 2005/0198934 | A1 | 9/2005 | Johnson |
| 2005/0198935 | A1 | 9/2005 | Johnson et al. |
| 2006/0048481 | A1 | 3/2006 | Hood et al. |
| 2006/0069485 | A1 | 3/2006 | Diekhans |
| 2006/0073860 | A1 * | 4/2006 | Redekop et al. .............. 460/112 |
| 2006/0073861 | A1 | 4/2006 | Lauer |
| 2006/0124002 | A1 | 6/2006 | Dubois |
| 2006/0166723 | A1 * | 7/2006 | Farley et al. .................. 460/112 |
| 2006/0183519 | A1 | 8/2006 | Benes |
| 2007/0037621 | A1 * | 2/2007 | Isfort ............................ 460/114 |
| 2007/0044447 | A1 | 3/2007 | Viaud |
| 2007/0081878 | A1 | 4/2007 | McHale et al. |
| 2007/0175198 | A1 | 8/2007 | Viaud |
| 2007/0191081 | A1 * | 8/2007 | Shields .......................... 460/114 |
| 2008/0036178 | A1 | 2/2008 | Slaubaugh |
| 2008/0087177 | A1 | 4/2008 | Olander |
| 2008/0141639 | A1 | 6/2008 | Shields |
| 2008/0224445 | A1 | 9/2008 | Viaud et al. |
| 2008/0248843 | A1 | 10/2008 | Birrell et al. |
| 2008/0264031 | A1 | 10/2008 | McHale et al. |
| 2008/0268927 | A1 | 10/2008 | Farley et al. |
| 2008/0271428 | A1 | 11/2008 | Rempe et al. |
| 2009/0007537 | A1 | 1/2009 | Savoie et al. |
| 2009/0017885 | A1 | 1/2009 | Halls |
| 2009/0019826 | A1 | 1/2009 | Rigney |
| 2009/0042625 | A1 | 2/2009 | Dow et al. |
| 2009/0043686 | A1 | 2/2009 | Matsumoto |
| 2009/0044710 | A1 | 2/2009 | Eylenbosch |
| 2009/0049817 | A1 | 2/2009 | Viaud |
| 2009/0057516 | A1 | 3/2009 | Schlesser et al. |
| 2009/0095662 | A1 | 4/2009 | Redekop et al. |
| 2009/0104952 | A1 | 4/2009 | Redekop et al. |
| 2009/0107102 | A1 | 4/2009 | Biziorek |
| 2009/0124309 | A1 | 5/2009 | Redekop et al. |
| 2009/0139195 | A1 | 6/2009 | Humbert |
| 2009/0193777 | A1 * | 8/2009 | Wendling ................. 56/10.2 R |

| | | | | | | | |
|---|---|---|---|---|---|---|---|
| 2010/0120482 | A1 | 5/2010 | Holmén et al. | FR | 2877807 | A1 | 5/2006 |
| 2010/0125788 | A1 | 5/2010 | Hieronymus et al. | FR | 2882623 | A1 | 9/2006 |
| 2010/0184494 | A1 | 7/2010 | Klein et al. | FR | 2877807 | B1 | 7/2008 |
| 2010/0242427 | A1 | 9/2010 | Anstey et al. | GB | 2003716 | A | 3/1979 |
| 2010/0252286 | A1 | 10/2010 | Brouwer et al. | GB | 2324498 | A | 10/1998 |
| 2010/0267432 | A1* | 10/2010 | Roberge et al. ............... 460/59 | JP | 2007228943 | A * | 9/2007 |
| 2010/0291983 | A1 | 11/2010 | Weichholdt et al. | JP | 20080011804 | A | 3/2009 |
| 2010/0291984 | A1 | 11/2010 | Pohlmann et al. | WO | WO-2006/074667 | A2 | 7/2006 |
| 2010/0291985 | A1 | 11/2010 | Pohlmann et al. | | | | |
| 2010/0311481 | A1* | 12/2010 | Ritter .......................... 460/112 | | | | |
| 2010/0326037 | A1* | 12/2010 | Dillon .......................... 56/341 | | | | |
| 2010/0326292 | A1* | 12/2010 | Dillon .......................... 100/2 | | | | |
| 2010/0330337 | A1* | 12/2010 | Dillon .......................... 428/156 | | | | |

FOREIGN PATENT DOCUMENTS

| | | | |
|---|---|---|---|
| DE | 19725699 | A1 | 12/1998 |
| DE | 19932336 | A1 | 1/2001 |
| DE | 10360598 | A1 | 7/2005 |
| EP | 0212270 | A1 | 3/1987 |
| EP | 0341508 | A1 | 11/1989 |
| EP | 1133914 | A2 | 9/2001 |
| EP | 1232683 | A1 | 8/2002 |
| EP | 1312253 | A1 | 5/2003 |
| EP | 1424001 | A1 | 6/2004 |
| EP | 1813146 | A2 | 8/2007 |
| EP | 1982575 | A1 | 10/2008 |
| EP | 2036426 | A2 | 3/2009 |
| EP | 2042028 | A1 | 4/2009 |
| EP | 2196082 | A1 | 6/2010 |
| FR | 1381170 | A | 12/1964 |

OTHER PUBLICATIONS

International Search Report for International Application No. PCT/IB2010/001778 Dated Oct. 29, 2010.
International Search Report for International Application No. PCT/IB2010/001780 Dated Oct. 29, 2010.
International Search Report for International Application No. PCT/IB2010/001775 Dated Oct. 29, 2010.
International Search Report for International Application No. PCT/IB2010/001781 Dated Nov. 25, 2010.
International Search Report for International Application No. PCT/IB2010/001784 Dated Nov. 25, 2010.
International Search Report for International Application No. PCT/IB2010/001779 Dated Oct. 29, 2010.
International Search Report for International Application No. PCT/IB2010/001797 Dated Nov. 25, 2010.
International Search Report for International Application No. PCT/IB2010/001794 Dated Nov. 25, 2010.

* cited by examiner

BALER COLLECTOR FOR COLLECTING BIOMASS FROM A COMBINE HARVESTER

CROSS REFERENCE TO RELATED APPLICATIONS

This application claims priority to co-pending U.S. provisional application No. 61/230,381 filed Jul. 31, 2009, entitled "COMBINE HARVESTER AND BALER FOR BIOMASS COLLECTION", which is entirely incorporated herein by reference. The present U.S. nonprovisional application is related to U.S. nonprovisional application Ser. No. 12/644,355 entitled "BIOMASS BALER", to U.S. nonprovisional application Ser. No. 12/644,505 entitled "BALER TONGUE FOR COLLECTING BIOMASS", to U.S. nonprovisional application Ser. No. 12/644,813 entitled "BALER PICKUP FOR COLLECTING BIOMASS FROM A COMBINE HARVESTER", to U.S. nonprovisional application Ser. No. 12/644,913 entitled "BIOMASS DEFLECTOR", to U.S. nonprovisional application Ser. No. 12/644,983 entitled "METHOD FOR PROJECTING BIOMASS FROM A COMBINE HARVESTER", to U.S. nonprovisional application Ser. No. 12/645,084 entitled "COMBINE CHOPPER FOR FEEDING A BALER", to U.S. nonprovisional application Ser. No. 12/645,174 entitled "BALER DENSITY CONTROL MECHANISM AND METHOD", and to U.S. nonprovisional application Ser. No. 12/645,247 entitled "USER INTERFACE WITH BIOMASS DEFLECTOR INFORMATION", which are incorporated herein by reference, and having been filed concurrently with the present application.

TECHNICAL FIELD

The present disclosure relates generally to combine residue and collection for biomass fuel production.

BACKGROUND

The combine harvester, or simply combine, has a history of development directed toward combining several operations into one complete machine. The combine completes these operations in one pass over a particular part of the field. Early combines were pulled through the fields by teams of horses or mules. Today, combines utilize GPS and auto-steering, but baling is typically performed as an additional step after the harvesting. After the combining operations are completed, a separate baler towed by a tractor is required to gather cut crops such as plant stalks from the field to form the plant stalks into round or square bales. Biomass fuels such as straw, hay or cereals may be pressed into bales to increase their energy density. The bales are subsequently picked up and trucked to where they are needed. What is needed is an improved means of combining the baling operation along with the operations of the combine harvester so that the crop may be harvested and the residue baled in a single pass of a combine harvester.

DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided to make this disclosure thorough and complete, and to fully convey the scope of the invention to those skilled in the art. The present invention is described more fully hereinbelow.

Figure 1:
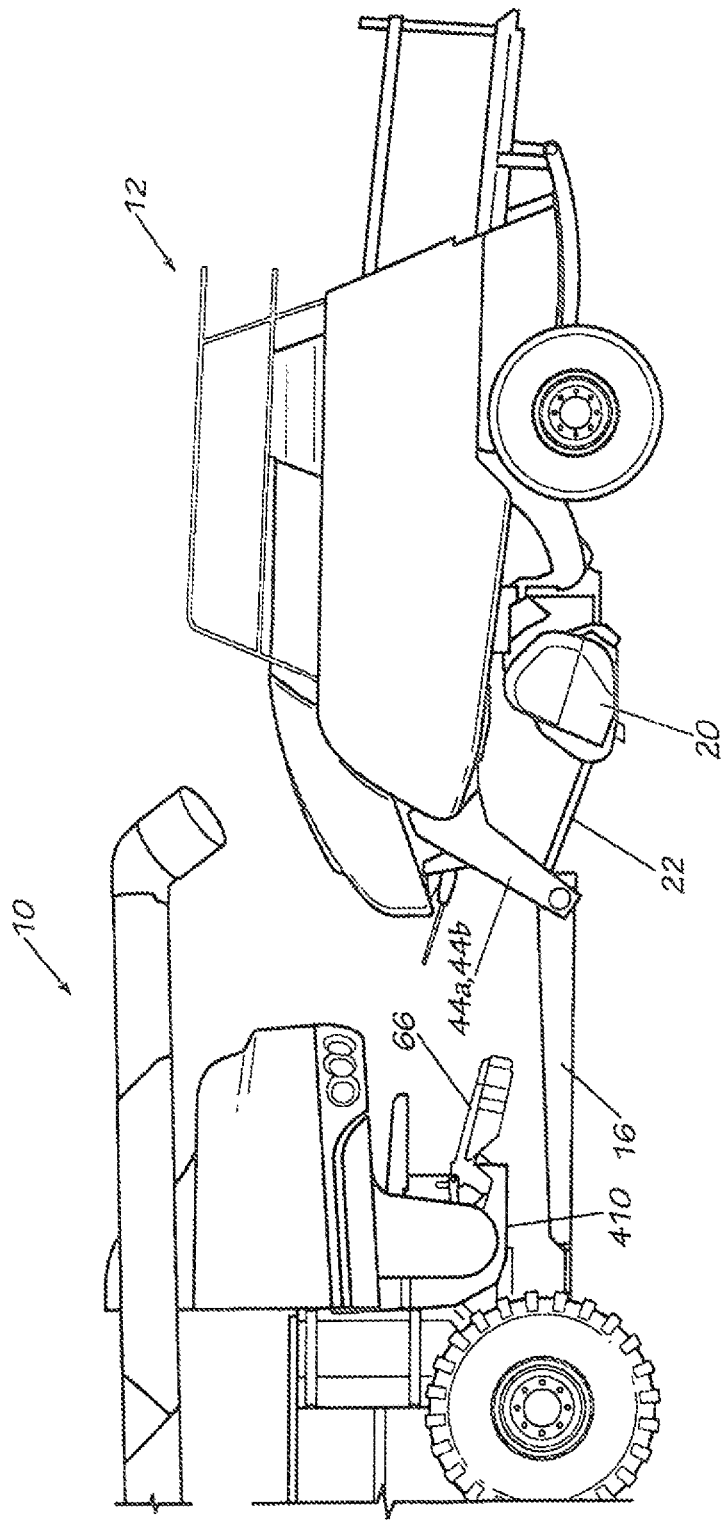
FIG. 1. is a partial side view of a combine harvester and a side view of a baler towed by the combine harvester.
Figure 2:
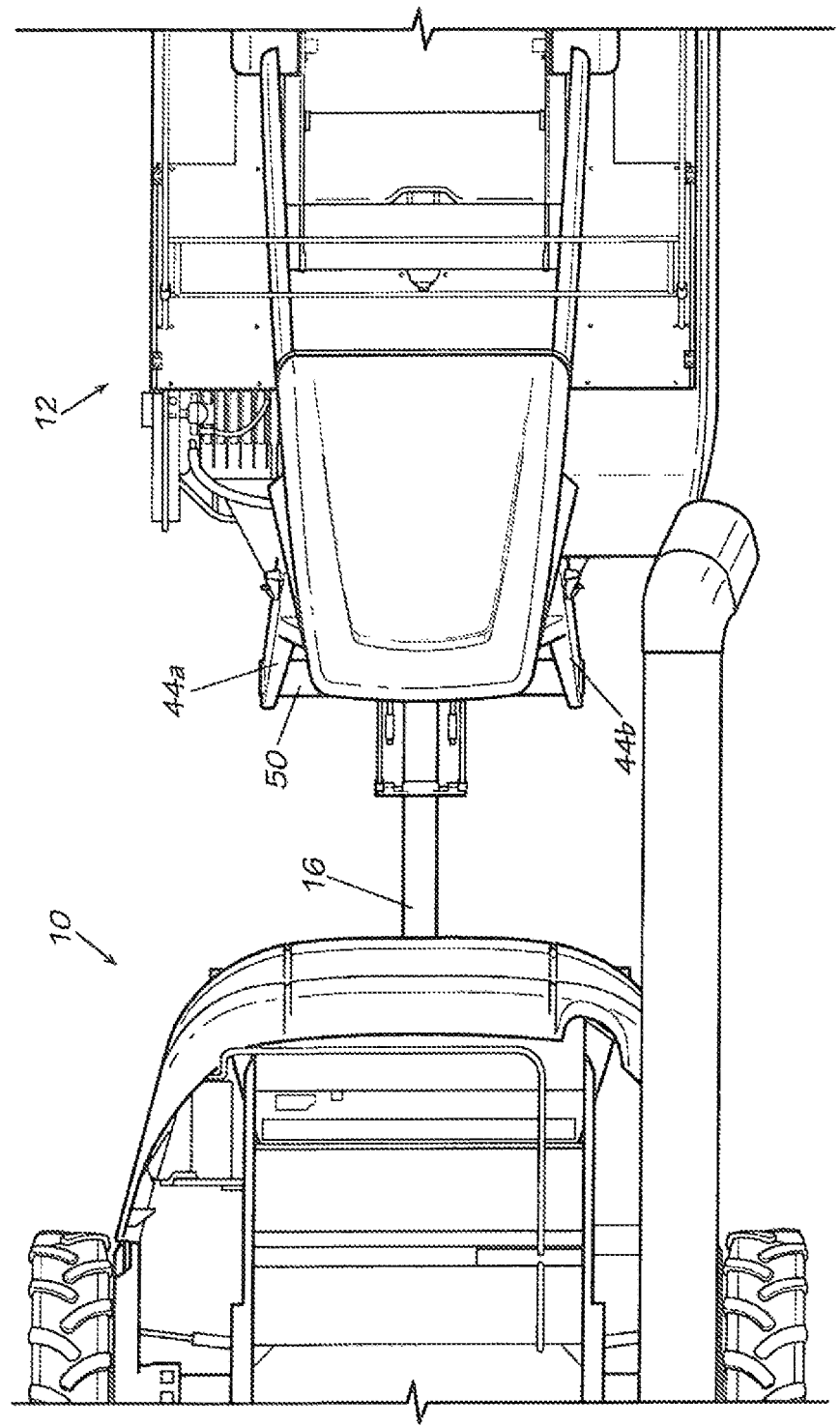
FIG. 2 is a top view of the combine and towed baler of FIG. 1.
Figure 3:
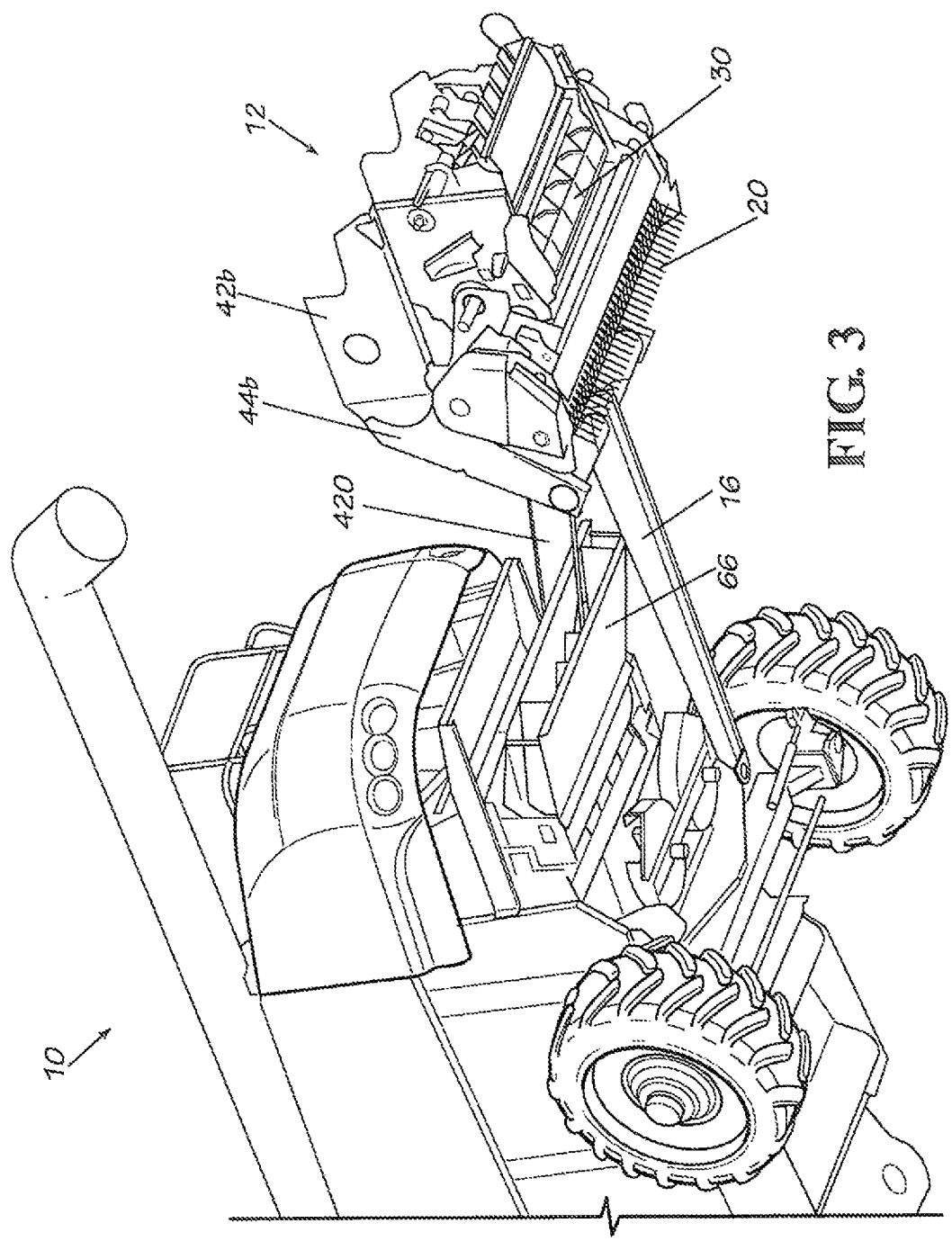
FIG. 3 is a bottom perspective view from the rear of the combine and towed baler of FIG. 1.

FIGS. 1-3 illustrate a combine 10 towing a baler 12 according to one embodiment of the present invention. The baler 12 is pivotally attached to the rear of the combine 10 via a tongue 16 which is coupled to the hitch point on the back of the combine 10. The baler 12 is preferably powered by a hydrostatic motor affixed to the flywheel of the baler 12 drawing its power source from the engine of the combine 10 via a hydrostatic pump.

The tongue 16 is attached to the chassis or main frame of the baler 12. The chassis is made of steel frame construction. As best shown in FIGS. 4-9, the tongue 16 is configured to be coupled to the combine 10 so that the crop material from the combine 10 can be transferred from the combine 10 directly to the baler 12 without redirection through the air by the combine and without the use of a conveyor coupled to either the combine 10 or the baler 12. The term "crop material" is intended to include grain and/or material other than grain (MOG), such as crop residue from the combine 10. Moreover, the tongue 16 and the chassis of the baler 12 are configured to the flow of crop material therethrough as described below. The crop material from the combine 10 preferably is directly discharged from the combine 10 to the baler 12. Also, the crop material from the combine 10 does not need to be oriented or moved upward from the back of the combine 10 in order to be transferred to the baler 12 or any other secondary vehicle according to an embodiment of the present invention.

The crop material from the combine 10 is projected to a target defined by the baler 12. As best shown in FIGS. 4, 7, 8 and 10, the target may be a baler collection device or feeding mechanism such as a pickup 20, and/or a collector such as a transfer pan 22. Pickup 20 may be a rotating drum-type mechanism with flexible tines or teeth for lifting and conveying material from the ground to the baler 12. The pickup 20 may be mounted to the chassis of baler 12 for pivoting movement about an upwardly and rearwardly disposed transverse pivot axis. In one or more embodiments, at least a portion of crop material may be directly received from the combine 10 at the baler 12 without a pickup 20. As best shown in FIG. 11, at least a portion of the crop material may be directly discharged to a transfer pan 292 in front of the packer 276 which prevents crop material that is thrown to the packer from falling to the ground. Packing forks 282 can grab at least a portion of the crop material collected on the transfer pan 292 and move the crop material back to the stuffer chute 90.

Also, if desired, crop material may also be lifted or received from the ground with the pickup 20. The pickup 20 may be either configured to receive material directly from the ground or directly from the combine 10. However, it is preferable not to mix crop material received directly from the combine 10 with crop material received from the ground because of the dirt and other contamination that occurs when crop material is on the ground. Introducing dirt into the bale can cause significant issues in a fuel conversion process. The crop material on the ground may be from the combine 10 towing the baler 12 or some other vehicle. A portion of crop material received directly from the combine 10 may be discharged from the same location on the combine 10 as any other portion of crop material discharged onto the ground to be picked up by the pickup 20 of the baler 12. However, in one or more embodiments, the combine 10 may have a chaff spreader as best shown in FIG. 3 where at least a portion of the chaff may be directed into the trajectory of the crop material coming out from the combine 10 and the tailboard 66. In another embodiment, the chaff can be directly discharged by the chaff spreader onto the baler 12. For example, the chaff may be received and collected on the transfer pan 22 for the pickup 20 or on the transfer pan 292 for the packer 276.

In one or more embodiments, air may be used to direct crop material collected on either of the transfer pans 22, 292 into the pickup 20 or just the packer 276 when the pickup 20 is not used. Too much crop material on the transfer pans 22, 292 may become an obstruction and therefore could prevent additional crop material from being collected and baled as desired. The transfer pans 22, 292 may include one or more openings or apertures for passing pressurized air therethough at the collected crop material. Preferably, the pressurized air comes from the baler 12 itself by using a hydraulic motor that spins a fan such as the hydraulic driven fans known to be used on balers to keep knotters free of debris. The air may be passed through one or more passageways or tubes extending to the apertures in the surfaces of the transfer pans 22, 292. At least a portion of the transfer pans may be hollow. Preferably the apertures are configured to pass air upward from the surface of the transfer pans 22, 292 and backward at an angle toward the pickup 20 and/or packer 276. In another embodiment, the air could be directly blown at the crop material from the passageways or tubes. The direction of at least a portion of the air flow can be reoriented while the crop material is being collected. In another embodiment, at least a portion of the air flow can be used to clear the crop material from the transfer pans 22, 292 when the portion of crop material collected on the transfer pans is not to be picked up by the pickup 20 or to be packed by the packer 276. For example, a portion of the crop material may be stuck and obstructing other crop material from being received on the transfer pans 22, 292.

Preferably the transfer pan 22, 292 is coupled to the baler 10 in such a manner that the collected crop material is permitted to slide across the transfer pan. 22. Also, the transfer pan 22 may be permitted to bounce somewhat when impacted by the crop material or as a result of the baler 12 advancing along the ground behind the combine 10. The bouncing allows at least a portion of the crop material to impact the transfer pan 22, 292 and then conveys or funnels at least a portion of the crop material toward the pickup 20 or toward the packer 276. Preferably, the transfer pan 22 directs the crop material onto the pickup 20. The transfer pan 22, 292 may be coupled to the baler by springs or chains 26, or a combination thereof. The shape and configuration of either of the transfer pans 22, 292 as well as the length of the chains 26 can be adjusted or the type of springs can be changed as needed to suit particular crops or conditions.

Figure 9:
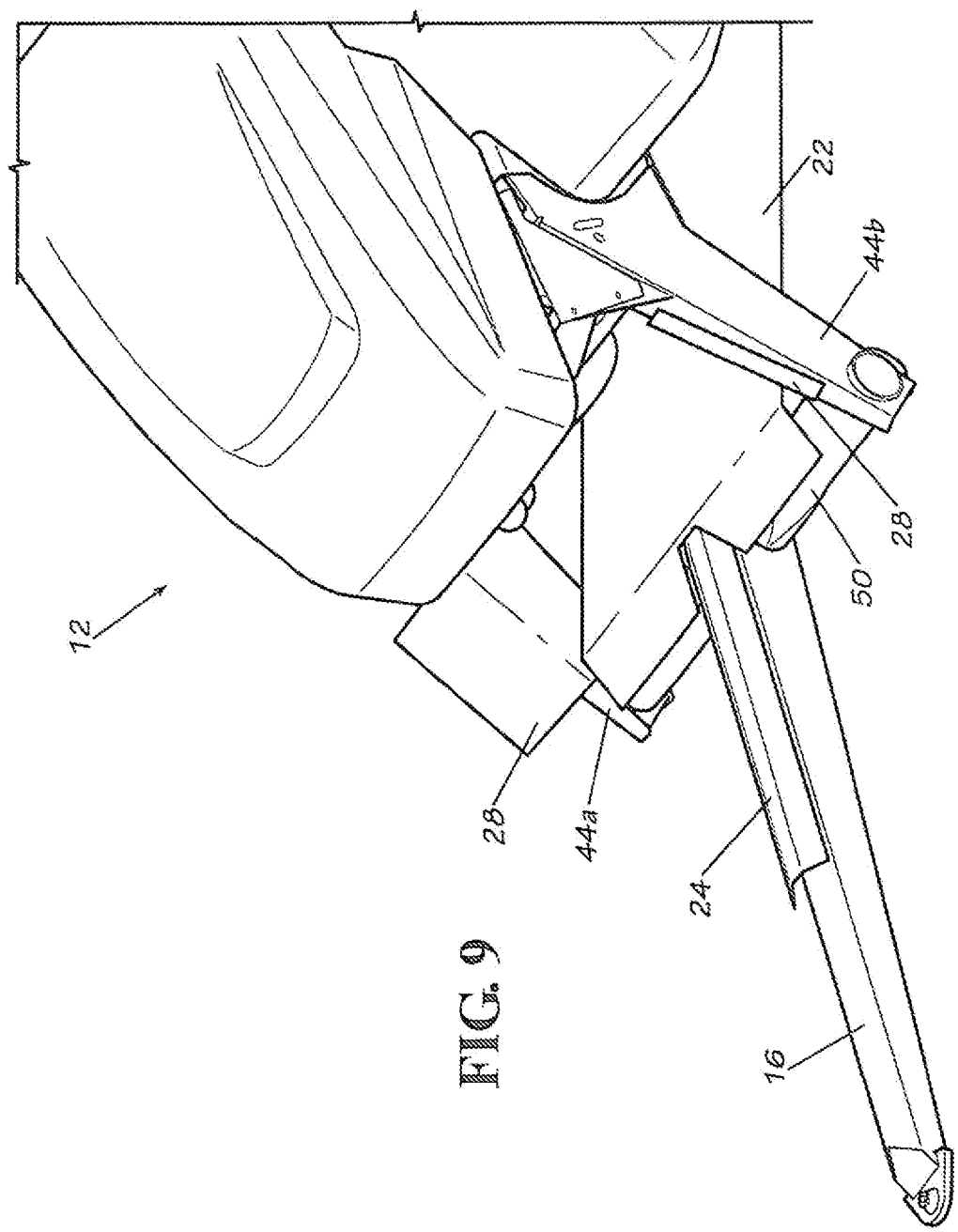
FIG. 9 is a top perspective view from the front of the towed baler with a transfer pan according to an alternative embodiment.

The transfer pans 22, 292 may also have an elongated portion 24, as best shown in FIG. 9, extending over the draw bar portion of the tongue 16 to protect electrical and/or hydraulic lines extending forward of the cross member 50 along the length of the tongue 16 from the impact of the crop material from the combine 10 intended for the baler 12. The electrical and hydraulic lines may run along the top of the tongue 16 or within the tongue 16 itself. In either case, the elongated portion 24 shields the electrical and hydraulic lines. Thus, the elongated portion 24 is a protective member and not intended for receiving material. The elongated portion 24 may be an integral part of the transfer pans 22, 292 or may be a separate part extending from the remainder of the transfer pans 22, 292 intended for receiving material from the combine 10. The elongated portion may extend almost the entire length of the tongue 16 or only a portion thereof.

Also, as shown in FIG. 9, one or more deflector panels 28 coupled to the baler 12 can be utilized to deflect the crop material from the combine 10 inward to the transfer pans 22, 292. The deflector panels 28 may be fastened to either side of the forward frame members 44a, 44b but are preferably fastened to the inside of the forward frame members 44a, 44b and extend in a forward manner from the forward frame members 44a, 44b. The deflector panels 28 may have a length generally corresponding with the length of the forward frame members 44a, 44b extending above the transfer pans 22, 292. Each of the deflector panels 28 may have two portions angled relative to one another where outer portions of the deflector panels 28 extend outward from the forward members 44a, 44b, and the inner portions are fastened to the side of the forward frame members 44a, 44b.

Figure 10:
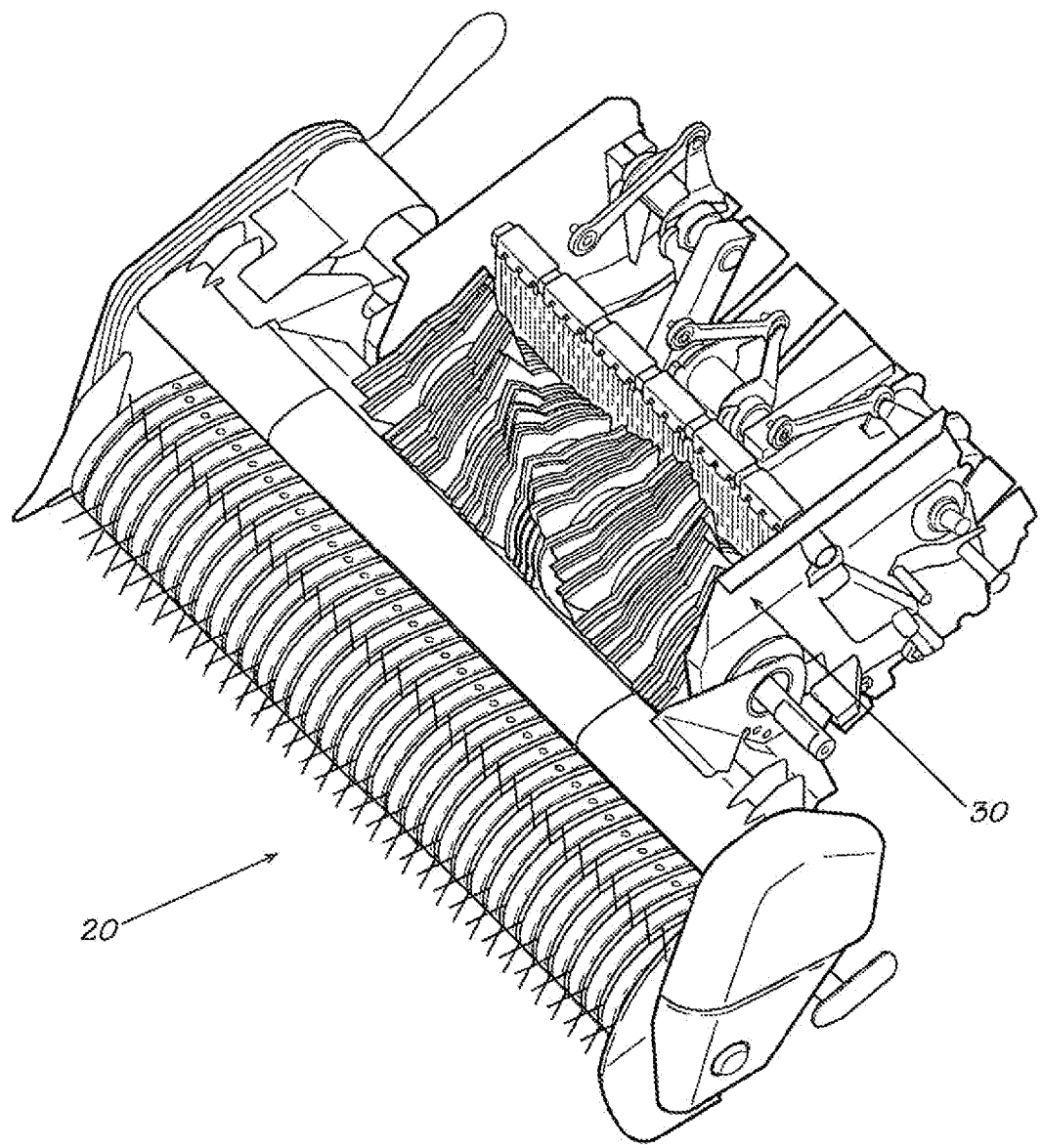
FIG. 10 is a close-up view of the pickup of the baler in combination with a cutter.
Figure 11:
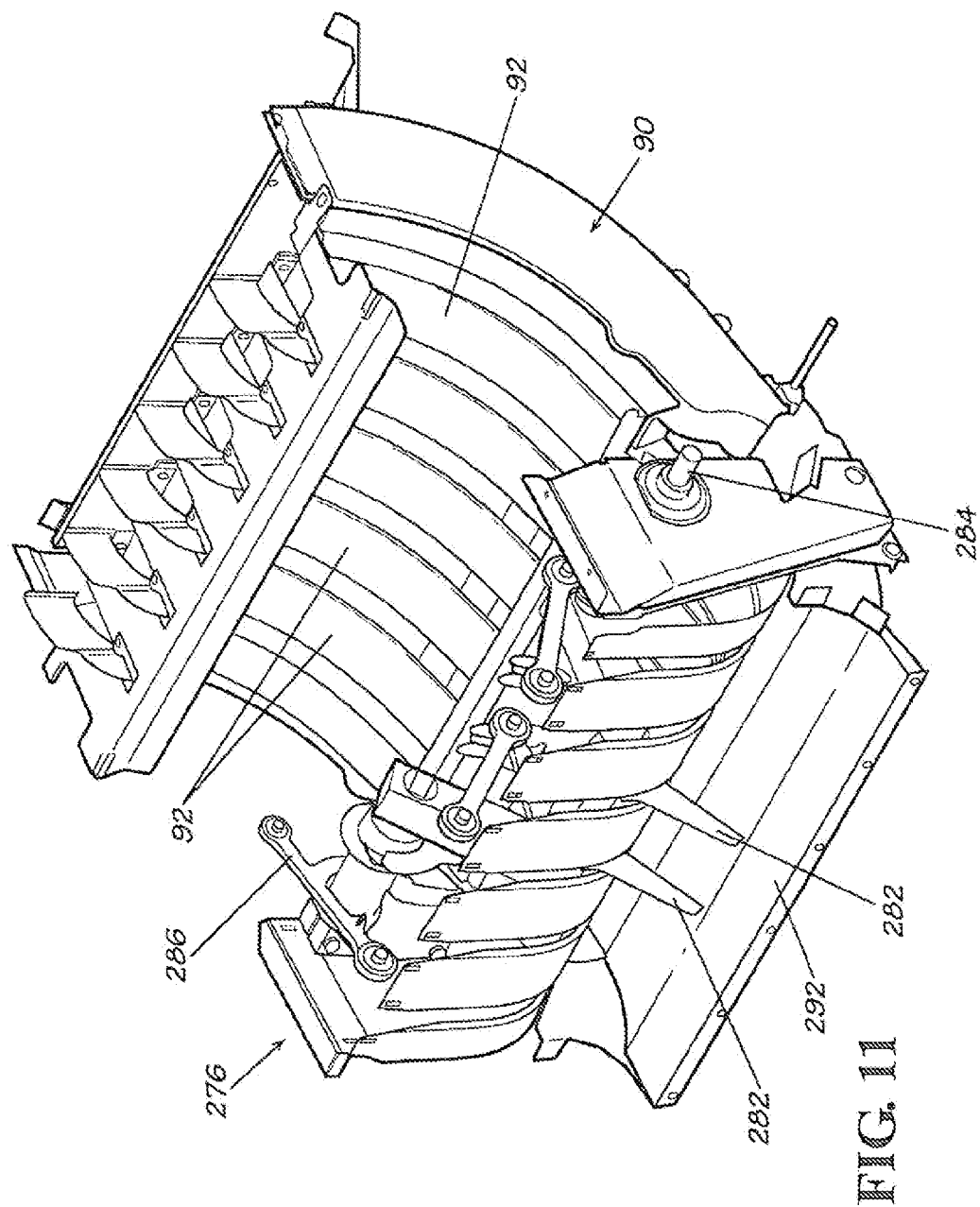
FIG. 11 is a front perspective view of a packer and stuffer chute of the baler.
Figure 12:
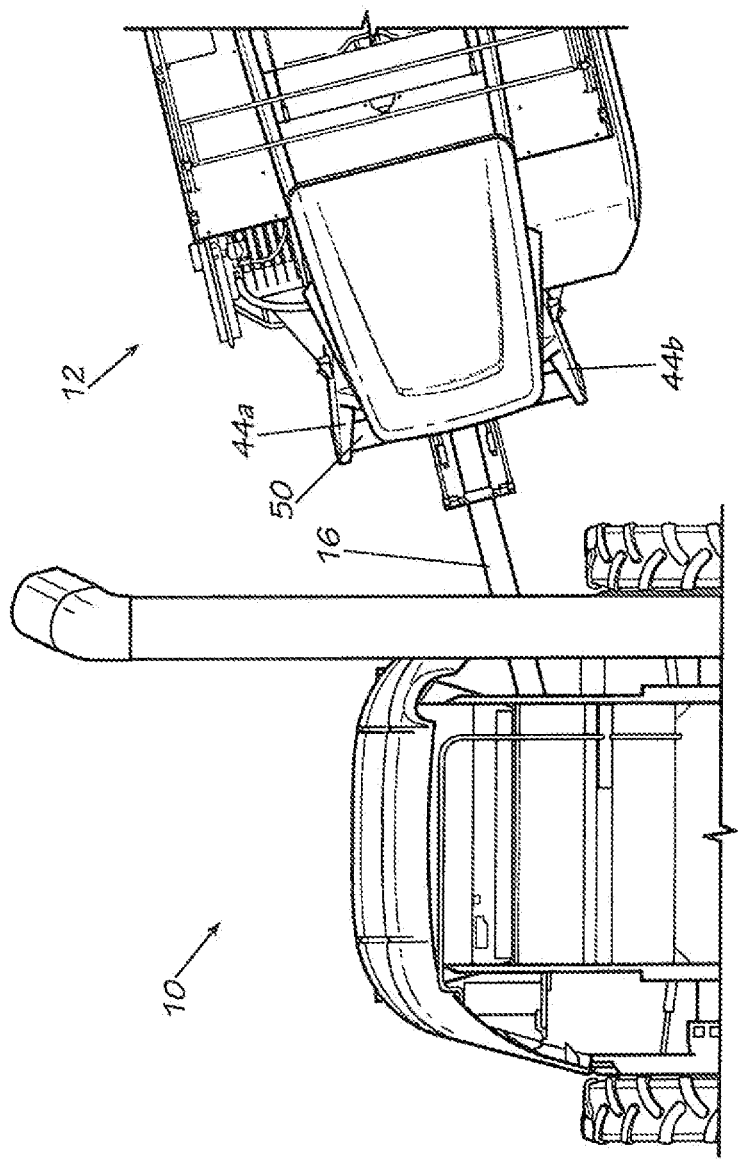
FIG. 12 is a top view of the baler and towed baler of FIG. 1 where the combine is turning.
Figure 13:
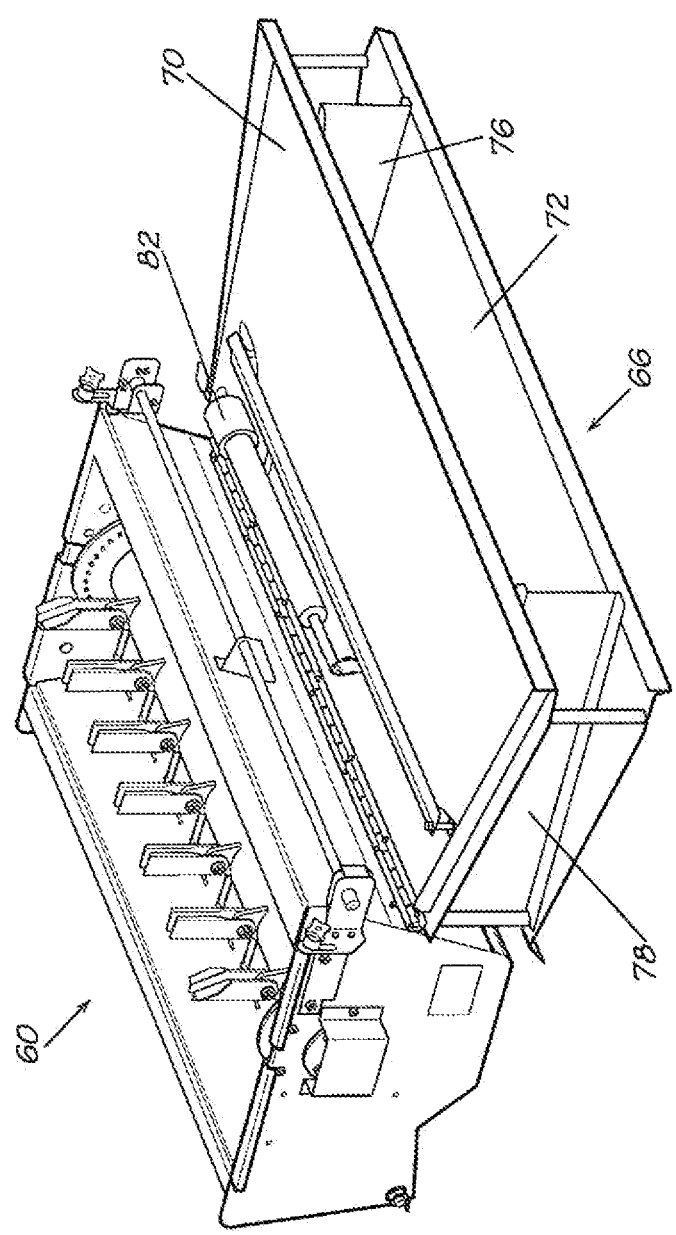
FIG. 13 is a rear perspective view of a tailboard and chopper for use with the combine according to one embodiment of the present invention.

As best shown in FIGS. 3 and 10, the baler 12 may include a cutter 30 positioned after the pickup 20 and before the packer 276 to reduce the distance the crop material must travel from the combine 10 before it is baled. As a result of using a cutter 30 in between the pickup 20 and the packer 36, the pickup 20 is moved forward toward the tongue 16, compared with when using just a pickup 20 on conventional balers, so that the distance between the back of the combine 10 and the target on the bailer 12 is reduced. By positioning the cutter 30 in between the pickup 20 and the packer 36, the pickup 20 and transfer pan 22 may be moved forward approximately eighteen inches or more. Alternatively, the length of some tongues 16 may be adjusted mechanically to obtain the desired distance between the back of the combine 10 and the baler 12. FIG. 12 shows the combine 10 turning but the length and shape of the tongue 16 is sufficient to preclude the tongue 16 or baler 12 from impacting the combine 10.

In another embodiment, the baler 12 may include a rotary feeding mechanism rather than the cutter 30. A rotary feeder is distinguishable from the cutter 30 in that the blades are different and that on some occasions it is not desirable to cut the crop material any further than it already has been. On such occasions though it may be desirable to merely feed the crop material with the rotary feeder into the packer 276.

Figure 4:
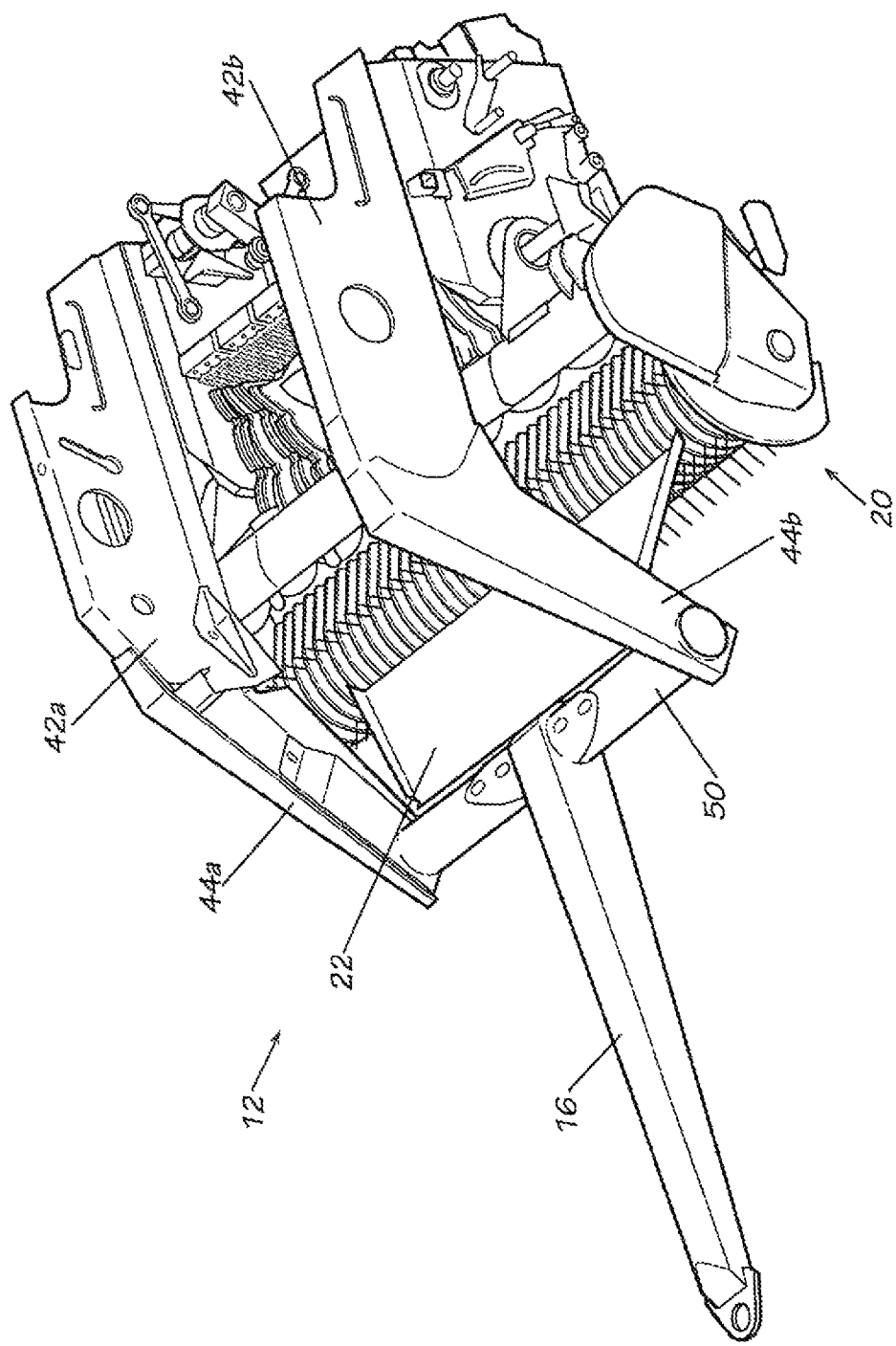
FIG. 4 is a partial top perspective view from the front of the frame and tongue of the towed baler with a transfer pan and a pickup.
Figure 5:
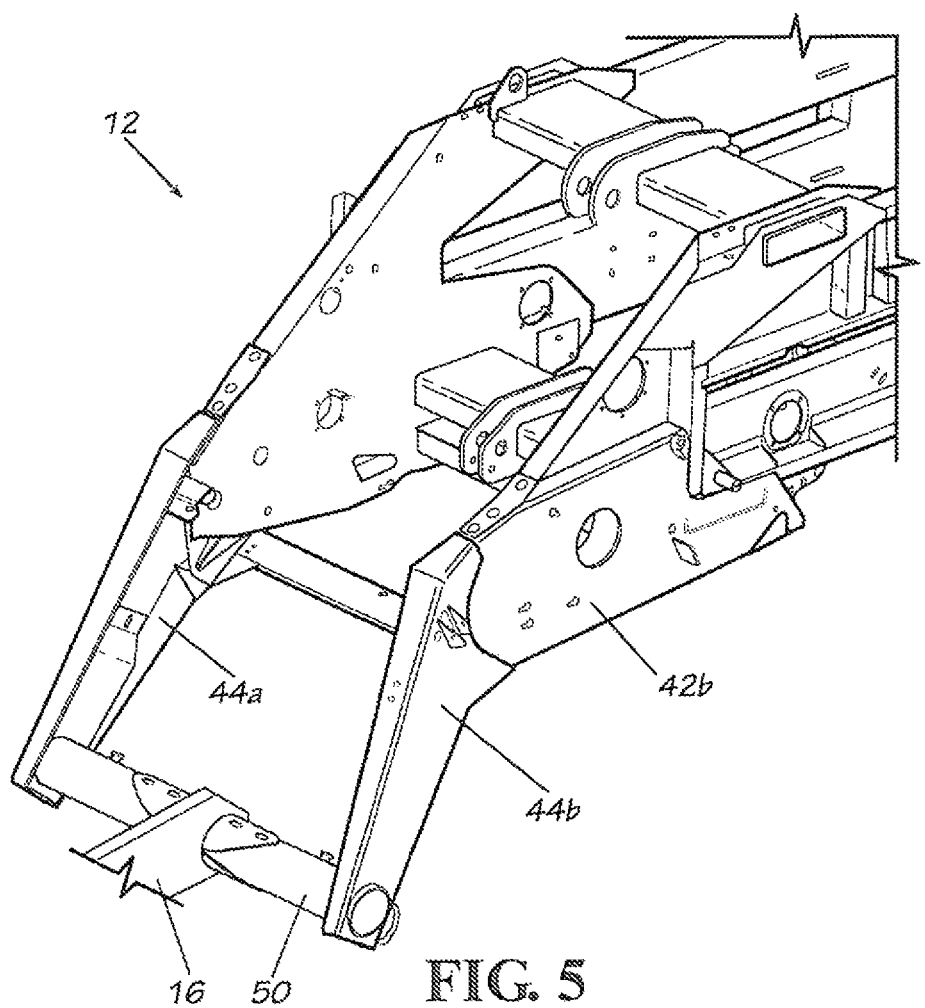
FIG. 5 is a is partial top perspective view from the front of the frame of the towed baler without the transfer pan and pickup.
Figure 6:
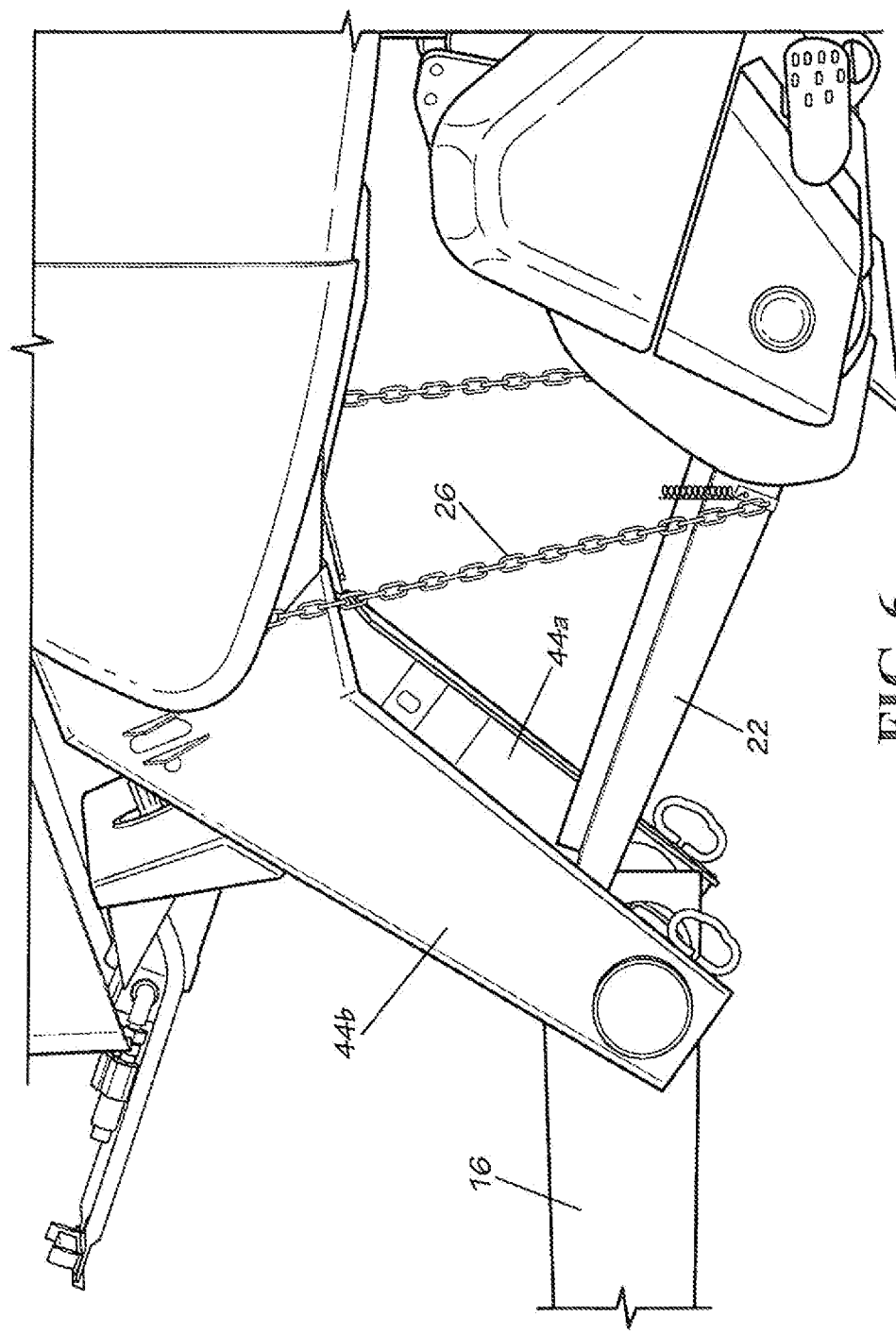
FIG. 6 is a close-up side view of the transfer pan.
Figure 7:
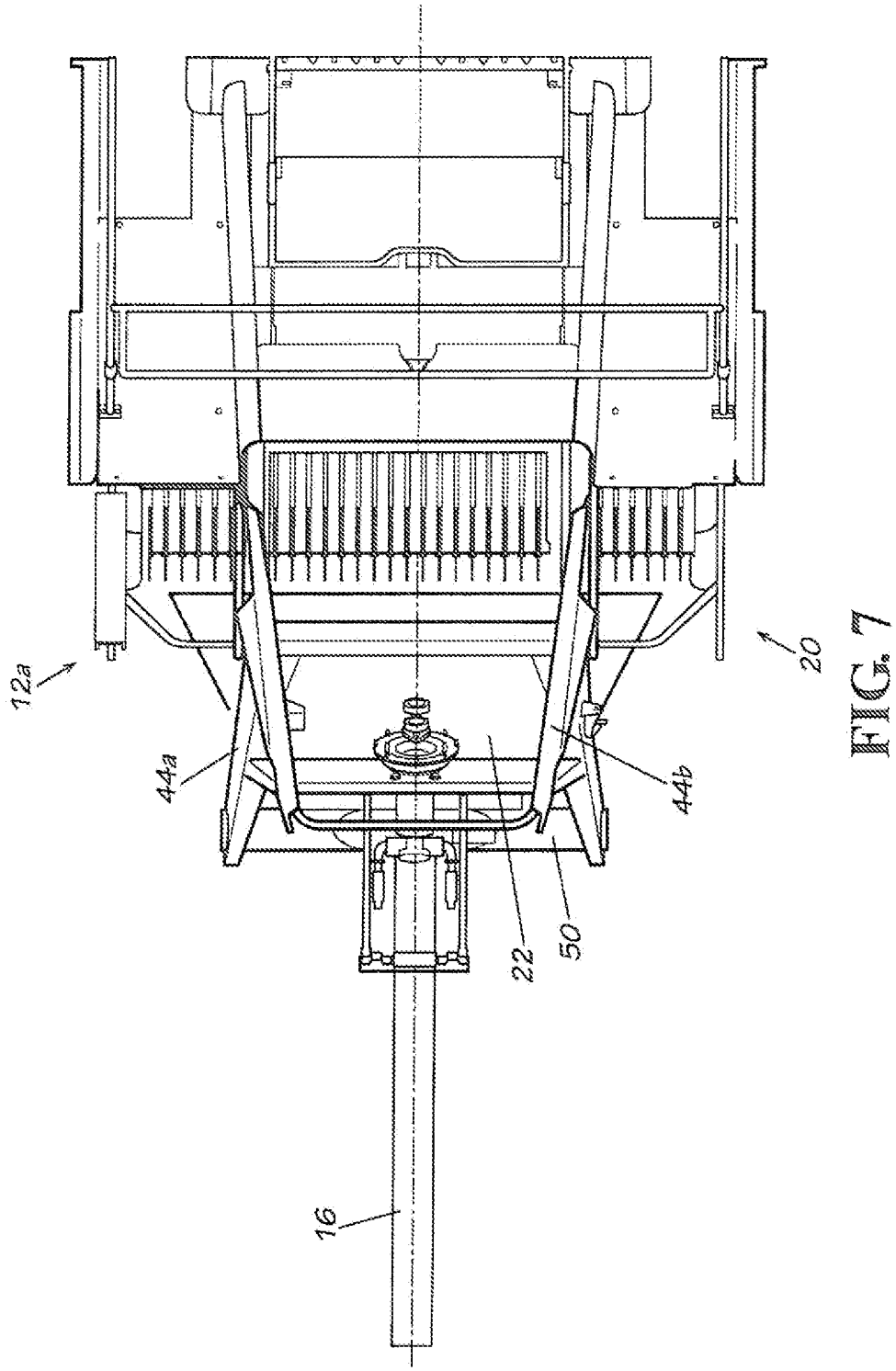
FIG. 7 is a top view of the towed baler of FIG. 4 with the transfer pan and pickup.
Figure 8:
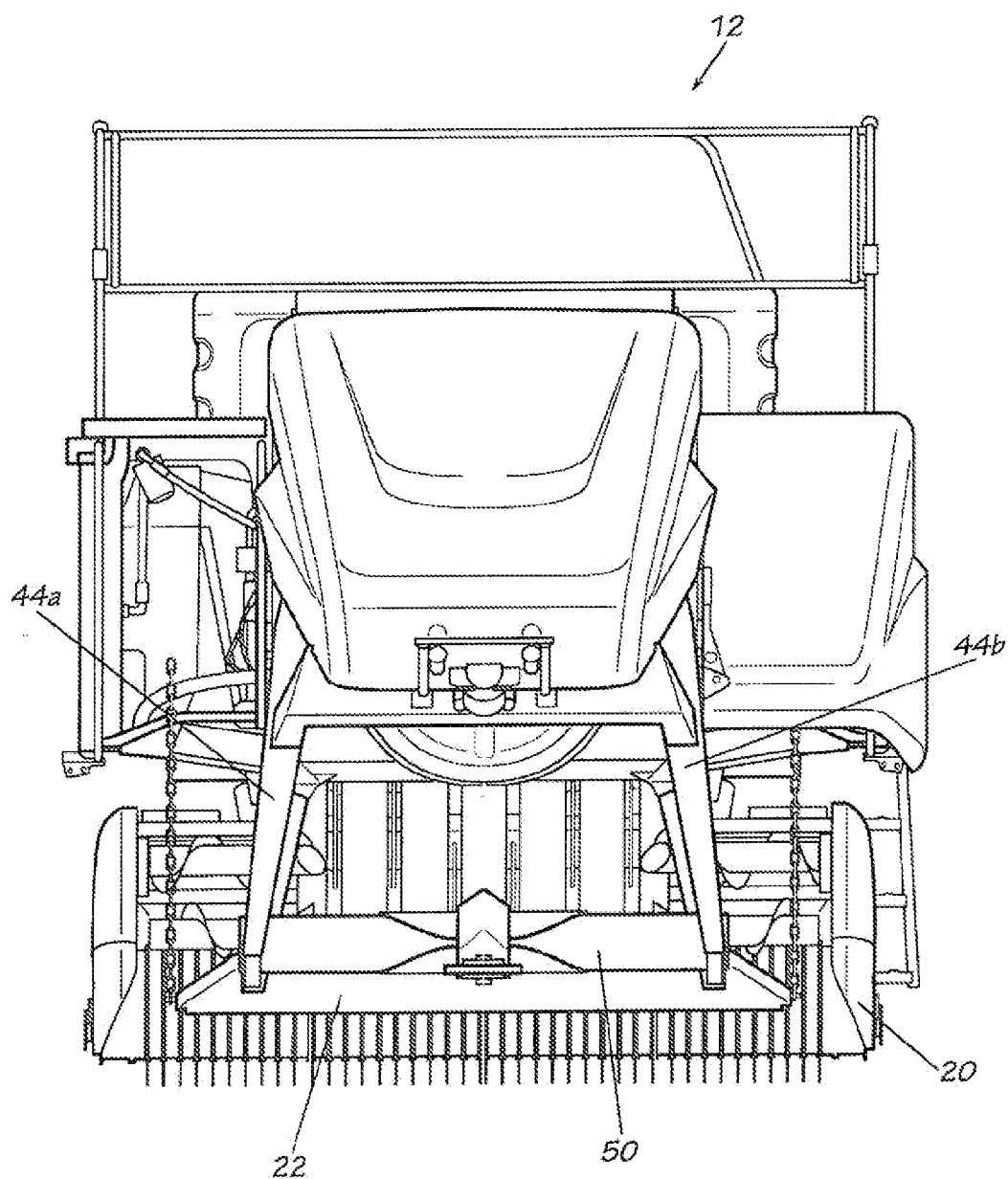
FIG. 8 is a front view of the towed baler of FIG. 4 with the transfer pan and pickup.

FIGS. 4 and 5 best depict a cutaway of a portion of the baler 12. Side frame portions 42a, 42b are similar to those used on conventional balers with conventional tongues adapted to be towed behind tractors. However, the main frame of baler 12 is modified from those of conventional balers because the baler 12 includes two forward frame members 44a, 44b. Each of the forward frame members 44a, 44b is connected at its upper end to an end of one of the side frame portions 42a, 44b and extends downward from the main frame. The lower ends of the two forward frame members 44a, 44b are preferably oriented slightly forward of the pickup 20 and in front of the point to which they attach to the side frame portions 42a, 42b. Moreover, the lower ends may be flared outwardly relative to one another, as best shown in FIGS. 2, 7 and 8, with a cross member 50 connected in between each lower end of the forward frame members 44a,44b. The cross member 50 and the draw bar portion of the tongue 16 define generally a T-shaped tongue which is distinguishable from common U-shaped tongues in use today with conventional balers. The forward frame members 44a, 44b are oriented alongside one another to define an opening therebetween and above the cross member 50. Because the lower ends of the forward frame members 44a, 44bb are flared outwardly, the opening is wider at its bottom adjacent the cross member 50 than the opening is at its top adjacent to where the forward frame members 44a, 44b join side frame portions 42a, 42b. Moreover, the configuration of the tongue 16 allows for greater visibility into the pickup 20 of the baler 12. The tongue 16 also permits flow of crop material directly from the ground as conventional balers do or directly from the combine 10 without either being obstructed by the tongue 16.

Figure 14:
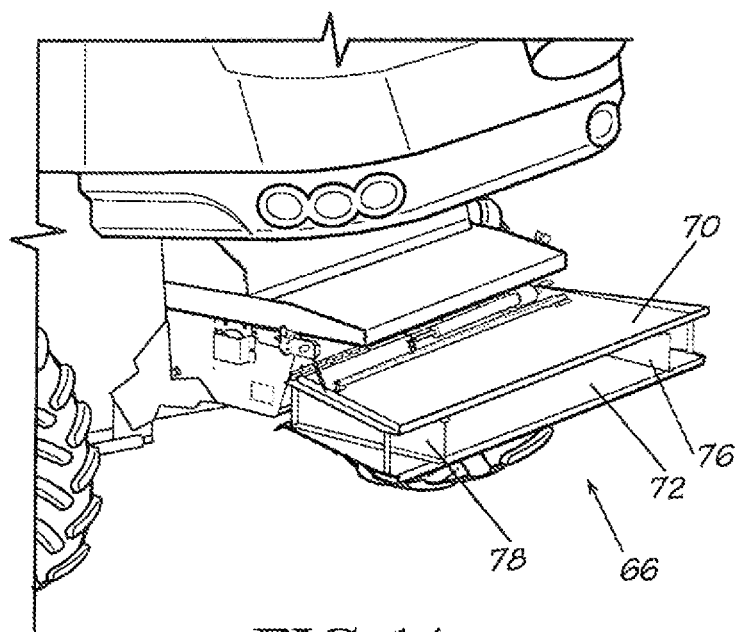
FIG. 14. is a rear perspective view of the tailboard of FIG. 13 on the back of the combine.
Figure 15:
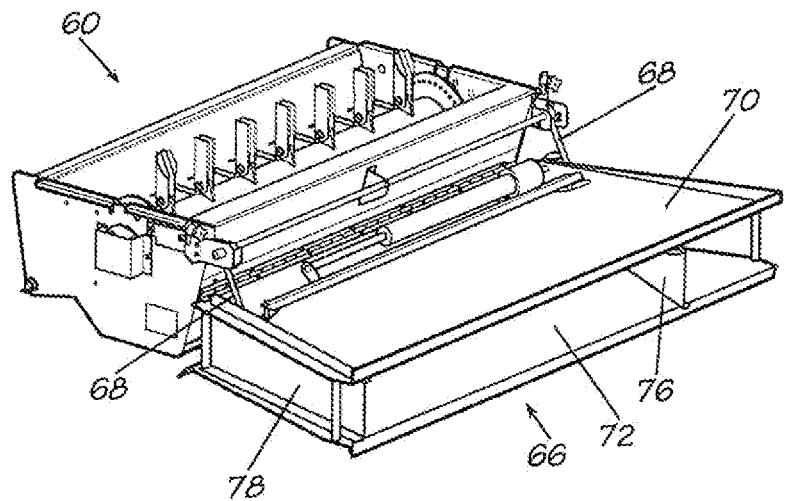
FIG. 15 is a rear perspective view of the tailboard with deflectors oriented to one side.
Figure 16:
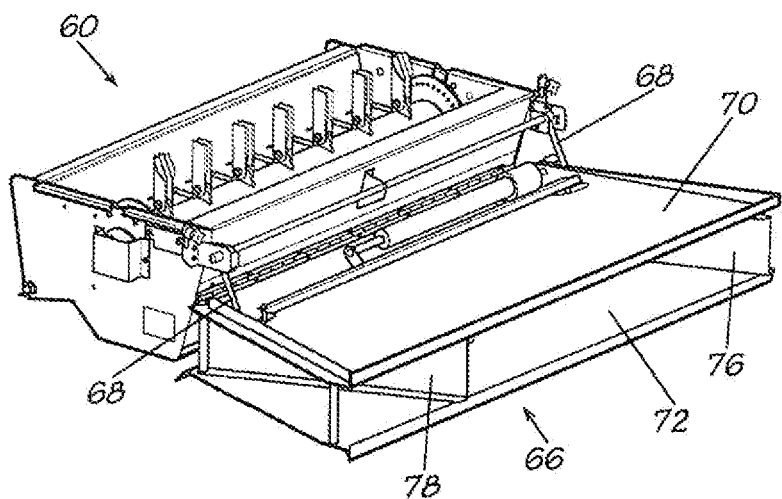
FIG. 16 is a rear perspective view of the tailboard with the deflectors oriented toward the other side.

The combine 10 may use a chopper 60 and/or a deflector such as a tailboard 66 as shown in FIGS. 13-16. The tailboard 66 may be connected to the combine 10 with adjustable arms 68 such as turn buckle links as shown in FIGS. 15 and 16 to orient the tailboard 66 in a fixed position while the combine 10 is operating. The adjustable arms 68 control the angle of the tailboard 66 relative the combine 10 and the ground by changing the length of the adjustable arms 68. The back edge of the tailboard 66 along its width is also preferably hingedly connected to the chopper 60 or on the back of the combine 10 so that that the distal end of the tailboard 66 may be moveably oriented upward or downward. FIG. 14 best illustrate the tailboard 66 hingedly connected to the combine 10. While the combine 10 with the baler 12 towed behind is traversing a path in a field it may become necessary at times to orient the tailboard 66 or the trajectory of the crop material from the tailboard 66 either upward or downward as a result of the changing terrain and as a result of making turns so that the crop material may be successfully directed toward the target on the bailer 12 as described below. Moreover, the tailboard 66 or the trajectory of the crop material, or a portion thereof, may be oriented or adjusted to ensure uniform bale density as described below. Preferably, because of the velocity of the crop material, the crop material is projected directly from the combine 10 in a substantially flat trajectory or other than upward trajectory, and then across the full distance between the combine 10 and the target of the baler 12 without redirection by the combine 10, where the crop material falls generally downward onto the target of the baler.

In one or more embodiments, the combine 10 may have a deflector such as a rotating deflector, which may rotate back and forth or all the way around to the extent necessary, to project crop material toward the baler 12. Preferably, the deflector is one or more pivoting deflection panels 76, 78. The tailboard 66 may include an upper board 70 and a lower board 72 with two or more deflection panels 76, 78 hingedly connected in between. One or both of the boards 70, 72 may be curved or configured to narrow the space therebetween to condense the crop material as it exits from the trailboard. Preferably each of the deflection panels 76, 78 are pivotally connected at one end to the tailboard 66 so that the opposite end of each of the deflection panels 76, 78 remains between the upper and lower boards 70, 72. Alternatively, the deflection panels 76, 78 may be connected to approximately the outer edges of upper and lower boards 70, 72 such that the distal ends of the deflection panels 76, 78 extend out from between the upper and lower boards 70, 72. Actuators 82 may be actuated so that the crop material trajectory may be narrowed. Alternatively, the defection panels 76, 78 may be oriented to permit the crop material to be directed toward one side or the other. However, it is contemplated that in some embodiments only one actuator 82 may be need to actuate the deflection panels 76, 77. Additional actuators may be used to orient the tailboard 66 upward or downward and therefore alter the trajectory of the crop material toward the baler 12 while the baler is towed by the combine 10. The actuators may be actuated manually by the operator or by feedback from the baler 12 and/or combine 10 as a result of detecting the orientation of the combine 10 or the baler 12 on the ground or the orientation of both the combine 10 and baler 12 relative each other.

Figure 17:
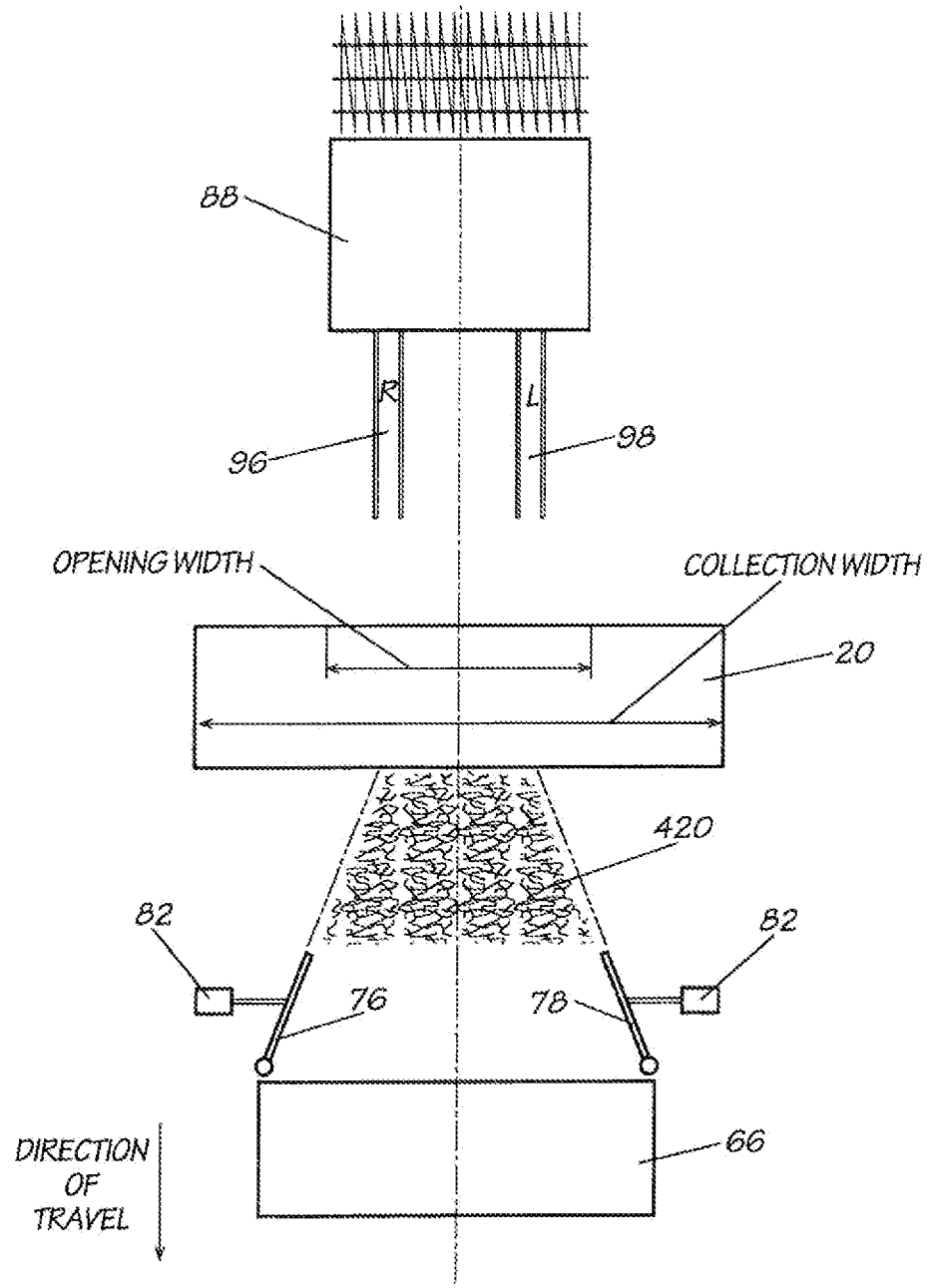
FIG. 17 is a top view of the tailboard with the deflectors oriented toward the center.
Figure 18:
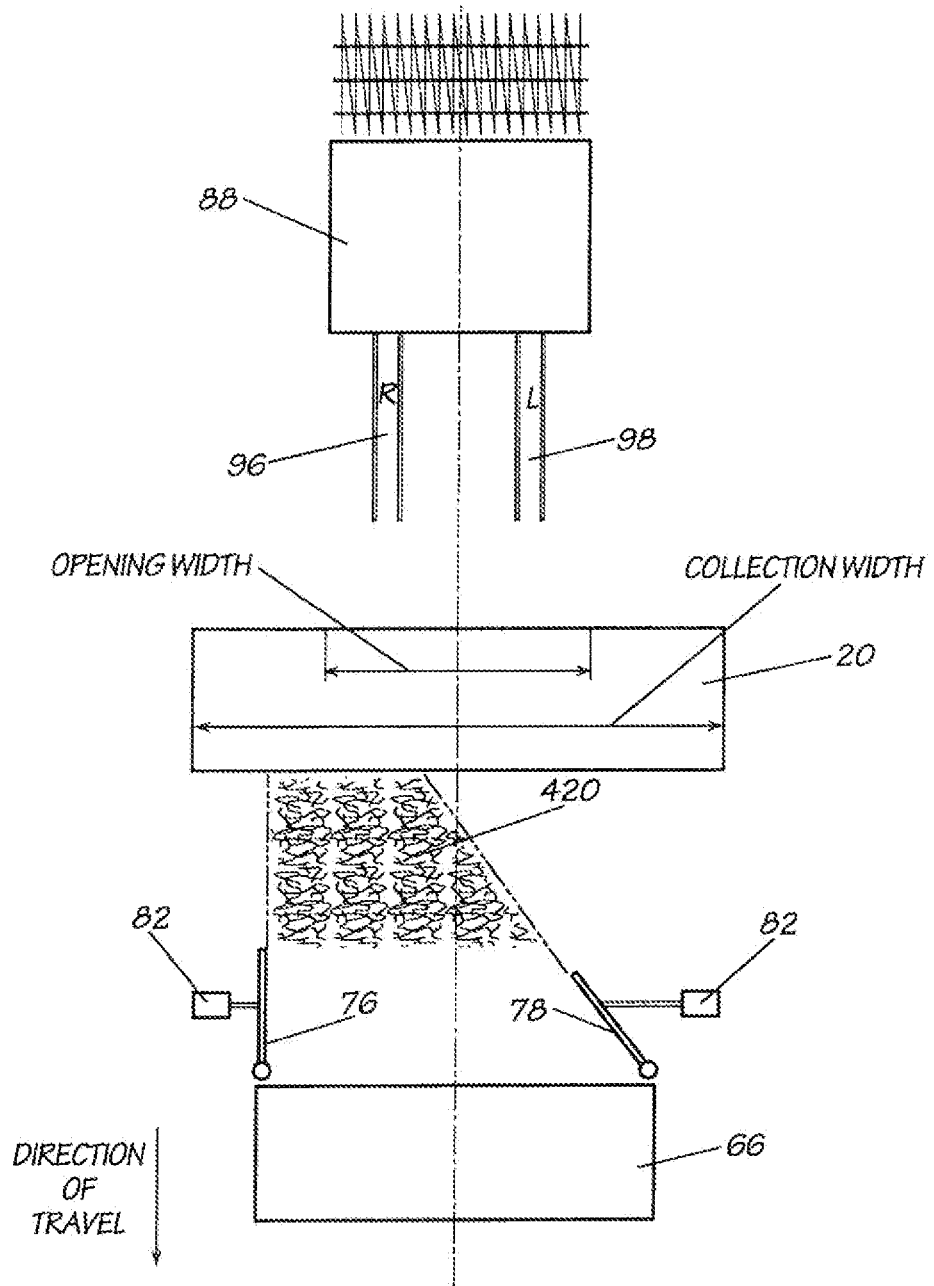
FIG. 18 is a top view similar to FIG. 17 but with a deflector oriented toward one side to direct more crop material to that side.
Figure 19:
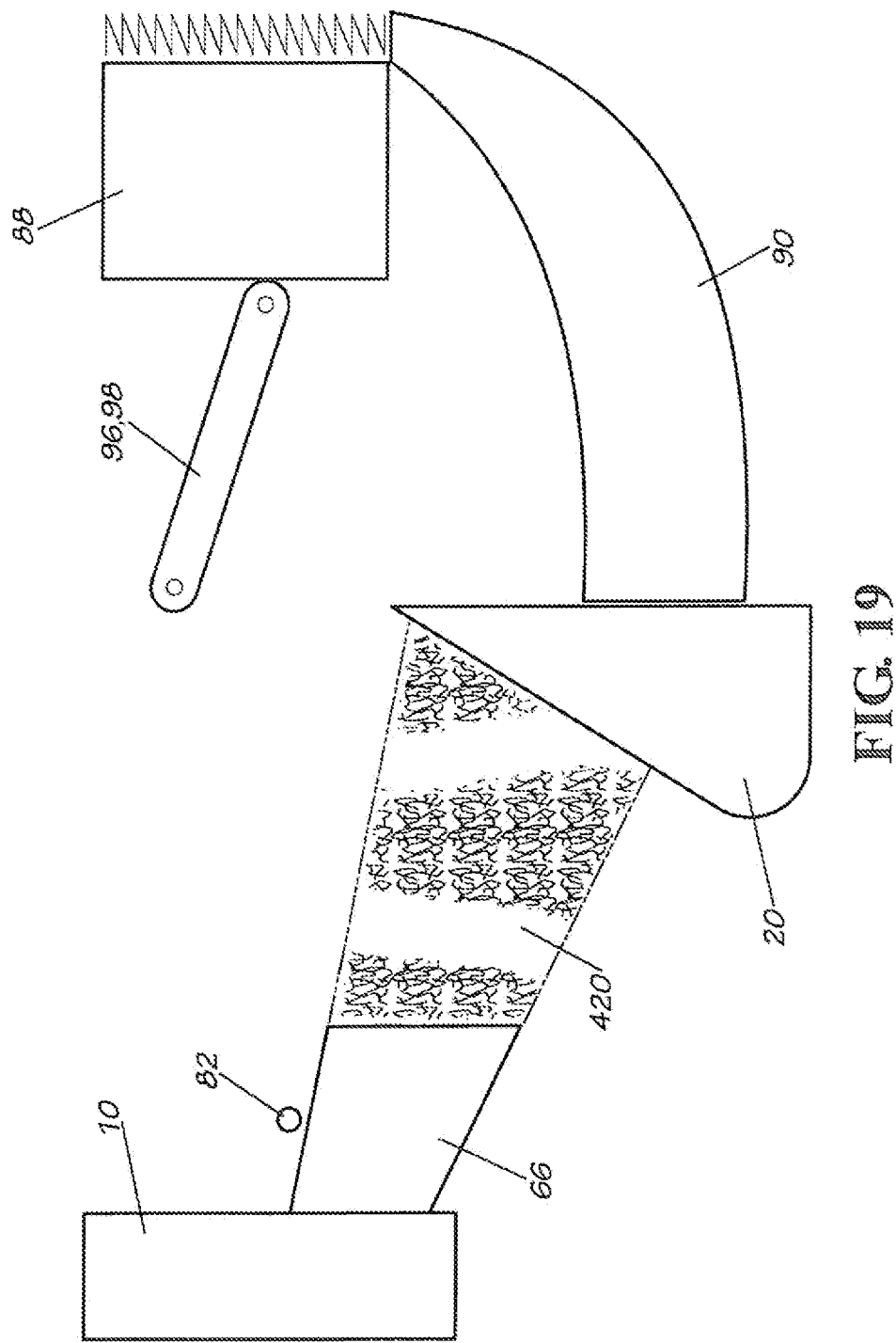
FIG. 19 is a partial side view of the combine and towed baler of FIG. 1 showing the trajectory of the crop material from the combine to the towed baler.
Figure 24:
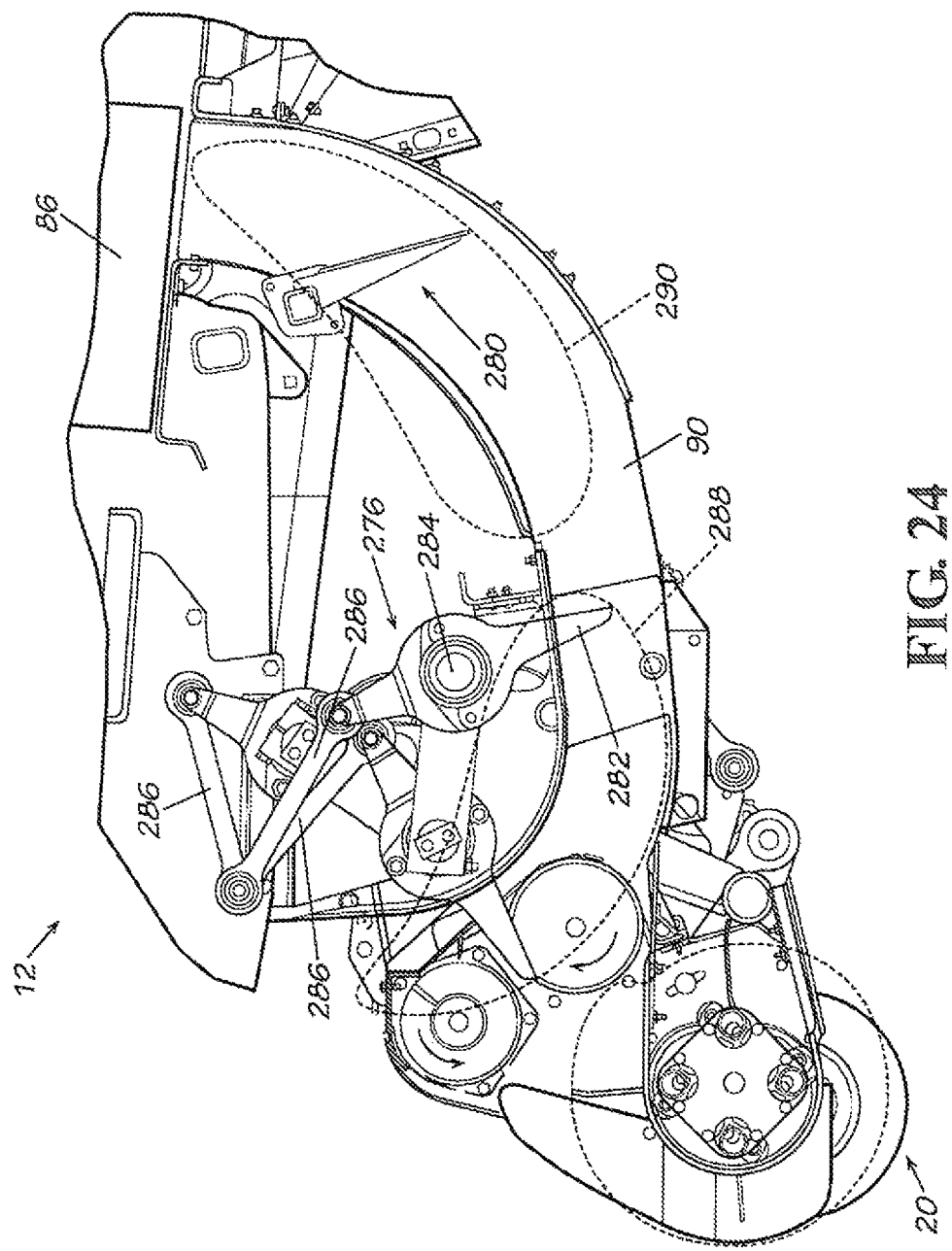
FIG. 24 is a partial side view of the baler showing the packer and stuffer chute.

FIGS. 17 and 18 illustrate a top view of the trajectory of the crop material from the combine 10 to the baler 12. FIGS. 17 and 18 also illustrate the collection width from the combine 10 relative the opening width of the tailboard 66 defined by the distal ends of the deflection panels 76, 77. A centerline 80 extends down the tailboard 66, between the deflection panels 76, 78 and through the reciprocating plunger 88 in a baling chamber 86 (FIG. 24). As explained above, the crop material may be directed to either the left or the right. FIG. 18 shows the crop material being directed toward the operator's right by actuating the deflection panel 78 laterally to one side. FIG. 19 is a side view illustrating the crop material being directly projected from the tailboard 66 to the baler collection device or pickup 20.

Figure 20:
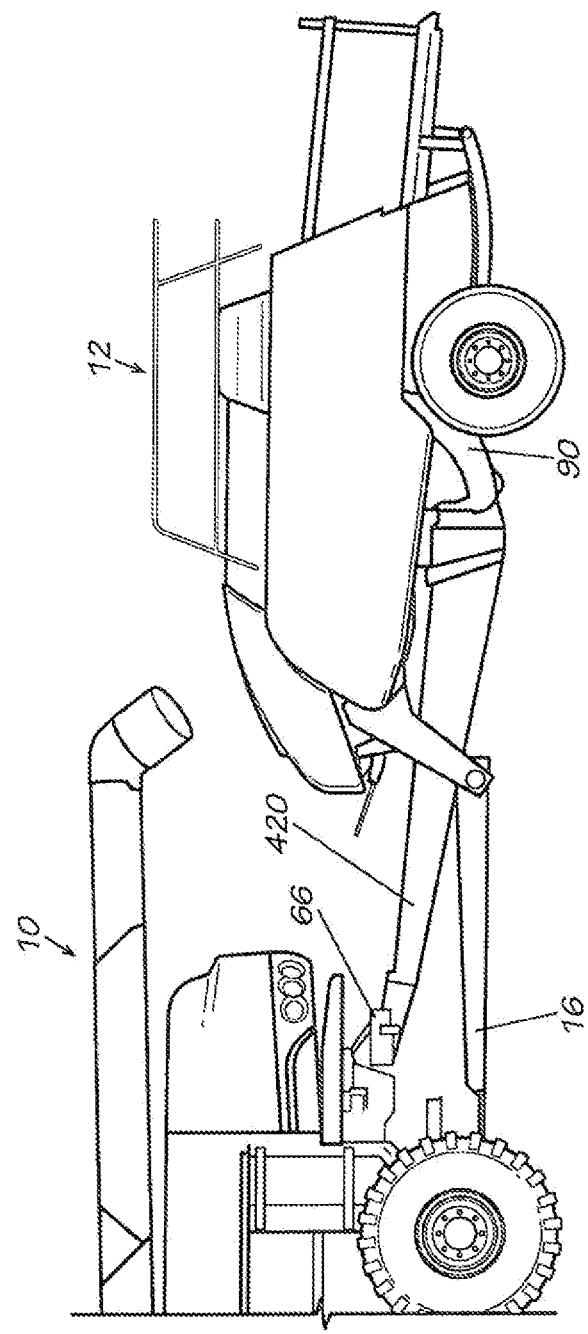
FIG. 20 is a side view corresponding somewhat with FIG. 19 and illustrating the trajectory of the crop material from the combine to the stuffer chute of the baler.

FIGS. 19 and 20 show a side view of the trajectory of the crop material from the combine 10. FIG. 19 also illustrates the stuffer chute 90 from where baling flake is delivered to the baling chamber 86. Flake delivered to the baling chamber 86 is compressed by the reciprocating plunger 88. Each time a flake is compressed electronic connecting rods 96, 98 measure the force applied to the flake. If the material is evenly distributed across the width of the baling chamber 86 the comparative forces are substantially equal. If crop distribution is uneven a disparity will occur between the two forces.

Figure 21:
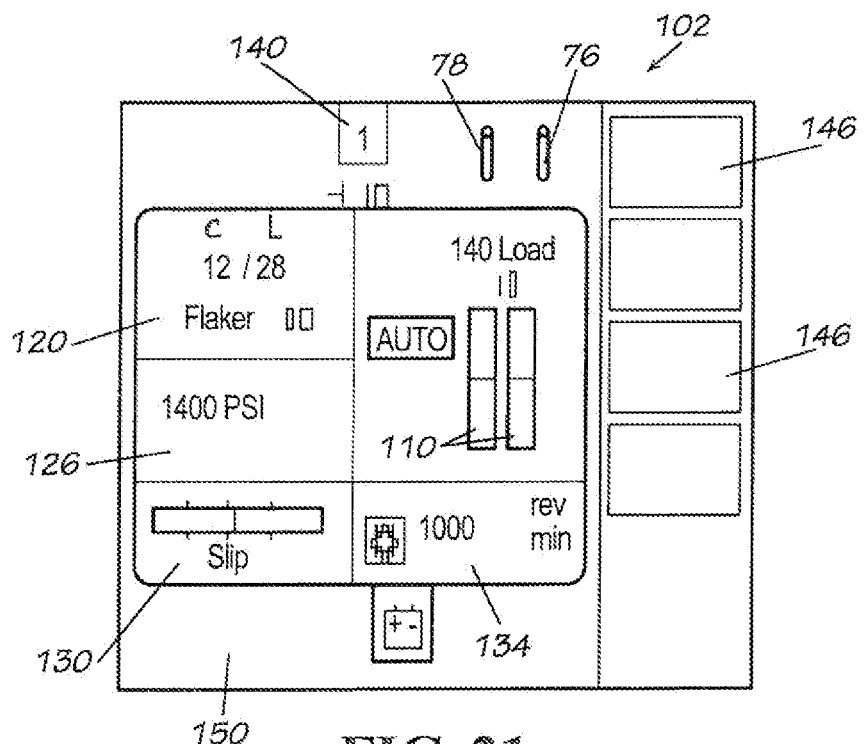
FIG. 21 illustrates one embodiment of a user interface displaying the orientation of deflectors of a tailboard.

A baler control interface 102, sometimes referred to as a virtual terminal or console, includes bar graphs 110 depicting substantially equal forces as shown in FIG. 21. The baler control interface 102 is preferably positioned within the combine 10 alongside a separate console dedicated to the performance of the combine 10 or on the baler 12. The operator of the combine 10 and the baler 12 may use the baler control interface 102 to optimize the projection of the crop material from the combine 10 to the baler 12 and to optimize the operation of the baler 12. Portions of the control interface 102 depict many performance aspects of the baler 12 such as the current bale and last bale flake count 120, pressure 26 applied on the cylinders on the doors to the baler 12, slip indication 130, PTO speed indicator 134, and plunger stroke per stuffer cycle 140. The control interface 102 also includes push button navigation icons 146 that change depending on what screens are desired. There is also an area 150 for warning/information icons.

Figure 22:
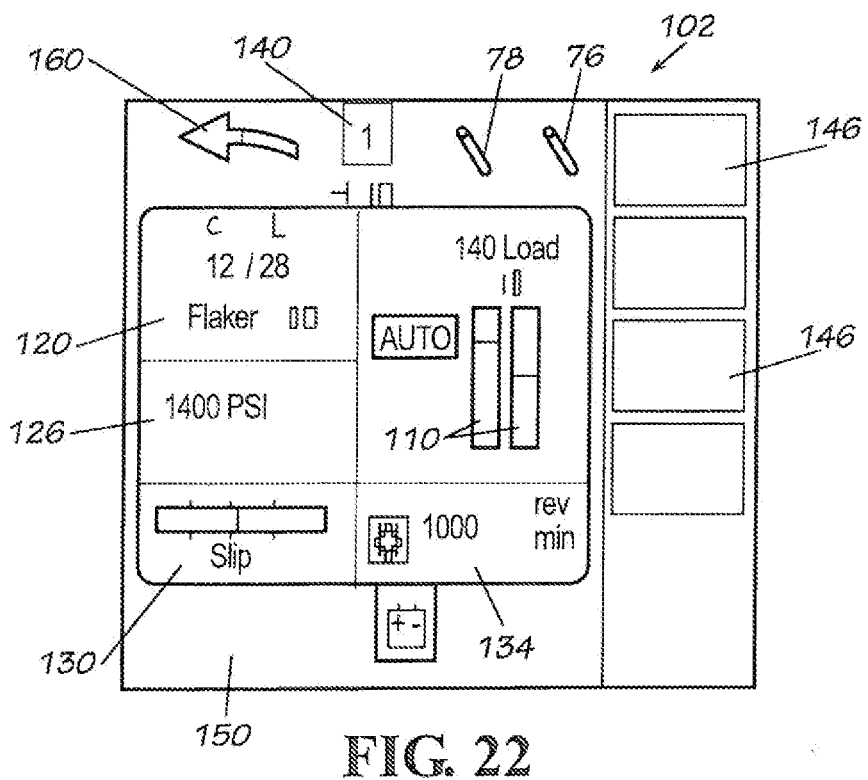
FIG. 22 illustrates the deflectors depicted in FIG. 21 oriented differently.

The control interface 102 for baler 12 also includes a drive arrow 160, such as the one depicted at the top of FIG. 22, which is typically used to indicate to the operator which way to steer and how hard to steer when the connecting rods 96, 98 indicate a disparity as described in greater detail below. In FIG. 22, the drive arrow 160 points to the left which corresponds with the pair of bar graphs 110 where the leftmost bar graph 110 indicates a greater bale density on the left of the baling chamber 86 relative the bale density on the right of the baling chamber 86. Therefore, the operator of a tractor typically would drive the tractor to the left so that the pickup 20 collects more on the operator's right side than had been before the adjustment to the path. However, when using the control interface 102 of a baler 12 in combination with a combine 10 according to the present invention, the operator is preferably not inclined to steer in response to the drive arrow 160 because when using a combine 10 the operator desires to drive the combine 10 as straight as possible or to follow planted rows.

The baler 12 provides feedback from the electric connecting rods 96, 98 to a baler controller in a manner known to those skilled in the art. In one embodiment, the controller includes a software module for processing the feedback generated by the connecting rods 96, 98. Load cells in each of the connecting rods 96, 98 generate a variable signal that corresponds with the length of one of the connecting rods 96, 98 as it varies. The changing signals generated by the load cells in the connecting rods 96, 98 are used to coordinate the pressure developed on the chamber doors by movement of the plunger 88. These signals are also used to generate the bar graphs 110 on the baler control interface 102.

These signals may also be used by the controller to provide control signals to the actuators 82 of the tailboard 66. During a condition of connecting rod force disparity the controller will direct the actuators 82 of the deflection panels 76, 78 to place more crop material to the left or to the right side of the baler 12. In FIGS. 17 and 18, the connecting rods 96, 98 are labeled as either Left or Right based on the operator's perspective. If the left connecting rod 98 has more force than the right connecting rod 96 then the crop flow will be directed to the right side. If the right connecting rod 96 has more force than the left connecting rod 98, crop will be deflected to the left side of the baler 12. Trajectory to the left side and directed to the target of the baler 12 is best shown in FIG. 18. Based on the feedback provided from the electronic connecting rods 96, 98, the actuators 82 orient the deflection panels 76, 78 so that crop material may be directed to one side or the other and to obtain even distribution across the width of the baling chamber 86. The crop material is directly projected from the combine 10 to the target on the baler 12 by at least a portion of the crop material passing through the opening defined by the forward frame members 44a, 44b and over the cross member 50. Preferably, the crop material is projected rearward at the target of the baler 12 and may be deflected to either side of the centerline 80 by a range of approximately five to forty-five degrees either side of the centerline 80.

The actuators 82 may include sensors such as 0 to 5 volt sensors so that the controller will know where each of the deflection panels 76, 78 is at. Alternatively, sensors may be positioned at each of the pivot points of the deflection panels 76, 78. In either case, the output from the baler 12 to the controller together with the positioning output of each of the actuators 82 associated with the deflection panels 76, 78 define a feedback loop. In one embodiment, the position of each of the deflection panels 76, 78 is depicted on the baler control interface 102 as shown in FIGS. 21 and 22. In FIG. 21 the deflection panels are oriented in a manner to direct the crop material straight back to the baler 12 when the combine 10 and the baler 12 are traveling in substantially a straight line. In FIG. 22, the deflection panels 76, 78 are instead oriented in a manner to direct the crop material from the combine 10 to the right relative the combine operator. The depiction of the deflection panels 76, 78 may be compared with the drive arrows 160 on the baler control interface 102. Alternatively, the drive arrows 160 could be replaced with the depiction of the positioning of the deflection panels 76, 78. In one embodiment, the control interface 102 could also show the degree to which the crop material is deflected to either side of straight back. For example, the control interface 102 could indicate the crop material is thrown fifteen degrees to one side.

Figure 23:
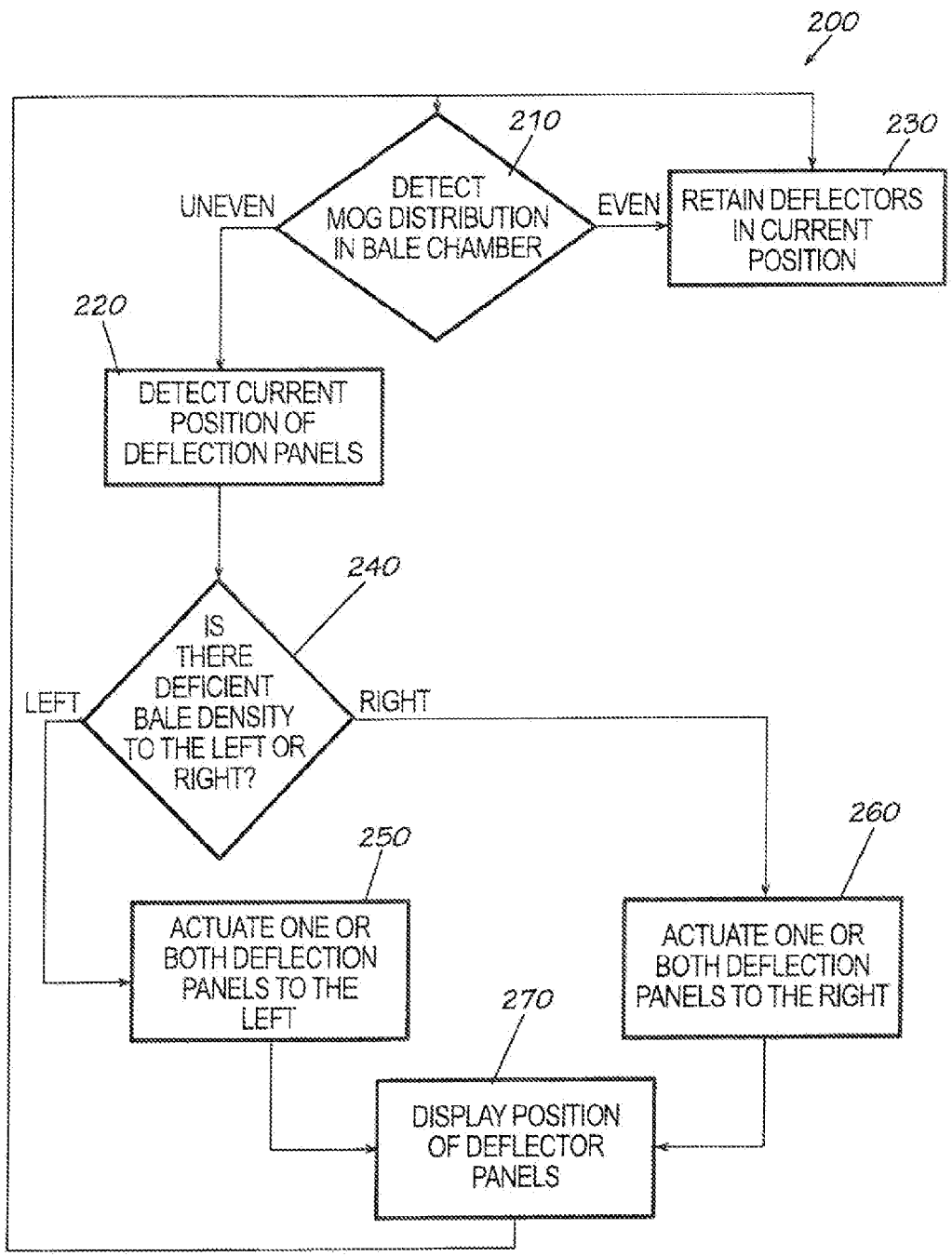
FIG. 23 illustrates a flow chart for a method for determining the amount of deflection is needed in the crop flow from the combine for even distribution of crop material in a formed bale.

FIG. 23 illustrates an exemplary embodiment of a flowchart of a method 200 of the present invention. The use of the baler 12 in combination with the combine 10 as described above constitutes an inventive method in addition to the combine 10 and baler 12 themselves. In practicing the method of determining the amount of deflection needed for the crop material, or a portion thereof, to be projected into the baler 12 with the tailboard 66 of the combine 10 described above, the steps include detecting whether the crop material is evenly distributed across the width of the baling chamber 86 as described above and as shown in decision block 210. Next, if there is a uneven distribution, the current position of the deflection panels 76, 78 is detected as depicted in process block 220. If there is even crop material distribution, then the deflection panels 76, 78 may be retained in their current position as shown in block 230. In decision block 240, the method 200 includes the step of determining whether there is deficient bale density in the baling chamber 86 on the operator's left or right. If on the left, process block 250 illustrates the step of actuating the actuators 82 to deflect one or both of the deflection panels 76, 78 to the left. If on the right, process block 260 illustrates the step of actuating the actuators 82 to deflect one or both of the deflection panels 76, 78 to the right. In either case, in one embodiment, the method 200 may include the step of displaying the changing position of the deflection panels 76, 78 on the control interface 102 as shown in process block 270.

The baler 12 may include a conventional density control mechanism broadly denoted by the numeral 300. The stuffer chute 90 is sometimes referred to as a duct, passage, charge chamber or prechamber. As best shown in FIG. 24, the stuffer chute 90 defines an internal passage through which the crop material travels from pickup 20 to baling chamber 86 during operation of the baler 12. The front end of the stuffer chute 90 is open to present an inlet. An outlet for the stuffer chute 90 is defined by an opening into the baling chamber 86. At least a portion of a top wall of the stuffer chute 90 is defined by a series of laterally spaced apart straps 92 shown in FIG. 25 that extend downwardly and forwardly from baling chamber 86 and terminate in forwardmost upturned front ends generally above the inlet. The rear of pickup 20 has a centrally disposed discharge opening, in fore-and-aft alignment with the inlet to the stuffer chamber 90.

Baler 12 further comprises a feeding mechanism for moving crop materials through stuffer chute 90. The feeding mechanism may, for example, comprise a suitable rotor associated with a cutter mechanism, or it may comprise other apparatuses. In the illustrated embodiment, the feeding mechanism includes a packer broadly denoted by the numeral 276 and a stuffer broadly denoted by the numeral 280 as best shown in FIG. 24. As is conventional and well understood by those skilled in the art, packer 276 may include a plurality of packing forks 282 that are mounted along a crankshaft 284 and controlled by control links 286 for moving the tips of packing forks 282 in a generally kidney-shaped path of travel 288 as illustrated in FIG. 24. Packer 276 is thus used to receive materials from pickup 20 and pack the same into stuffer chute 90 for preparing a precompressed, preshaped charge of crop materials that conforms generally to the interior dimensions of stuffer chute 90 while the opening to the baling chamber 86 is closed by the reciprocating plunger 88.

The stuffer 280, as is conventional and well understood by those skilled in the art, functions to sweep through its own kidney shaped path of travel 290 as illustrated in FIG. 24 to sweep the prepared charge up into baling chamber 86 between compression strokes of plunger 88 when the opening to the baling chamber 86 is uncovered. A conventional density control mechanism that includes a stuffer sensor door in the floor of the stuffer chute 90 functions in a manner well understood by those skilled in the art to check the density of each charge forming within the stuffer chute and to cause the stuffer 280 to pause in the event that a charge having predetermined characteristics has not accumulated within stuffer chute 90 by the next time stuffer 280 would normally sweep the charge up into the baling chamber 86. The conventional density control mechanism in the floor of the baler 12 causes the stuffer 280 to dwell for one or more successive stuffing strokes in the event the charge accumulating within stuffer chute 90 has not reached the shape and density desired. The principles of operation of the stuffer 280 are well understood by those skilled in the art.

The baler 12 may include an improved density control mechanism 300 that also functions in a manner to check the density of each charge forming within the stuffer chute 90 and to cause the stuffer 280 to pause in the event that a charge having predetermined characteristics has not accumulated within stuffer chute 90. The density control mechanism 300 includes a stuffer clutch assembly 310 and a sensor or trigger such as trigger assembly 320 positioned through one or both sidewalls of a stuffer chute 90. A conventional stuffer sensor door in the floor of the stuffer chute 90 may be replaced with the trigger assembly 320 thereby eliminating any possible interruptions in the flow of crop material through the stuffer chute 90. The stuffer sensor door creates interference or friction and now with the reduced interference and friction within the stuffer chute 90 the crop material such as MOG gets to the top of the stuffer chute 90 more easily to complete a fully filled flake.

Figure 25:
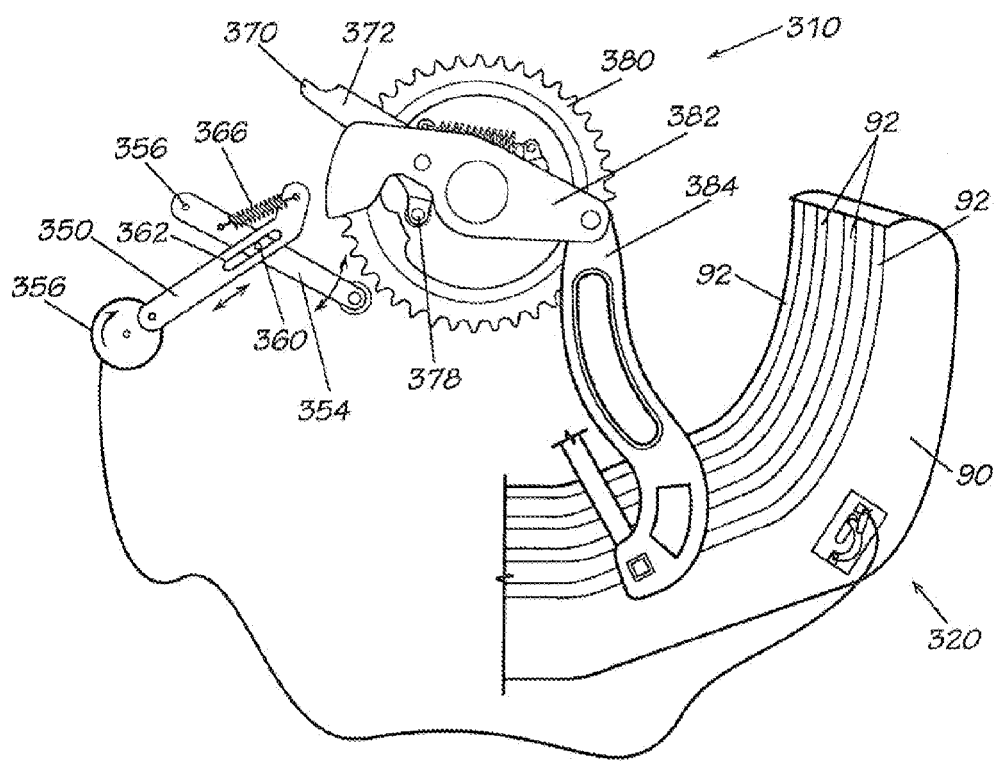
FIG. 25 illustrates a density control mechanism according to one embodiment of the present invention.
Figure 26:
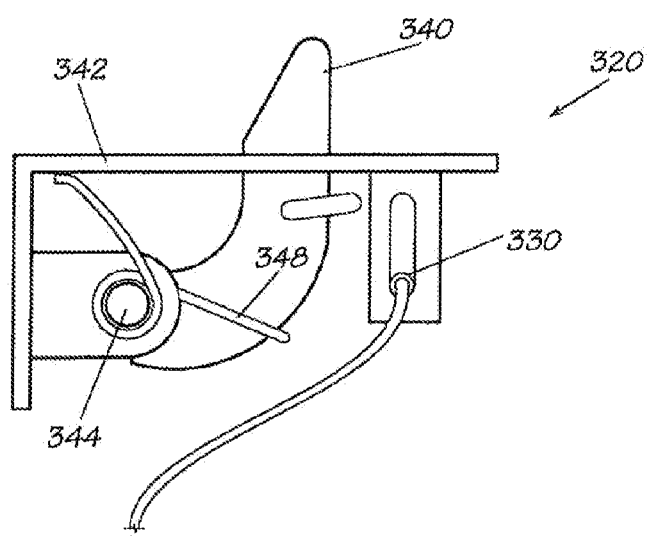
FIG. 26 illustrates a trigger assembly of the density control mechanism of FIG. 25.

The trigger assembly 320 may be positioned in various places along either side of the stuffer chute 90 depending on the type of crop material and depending on what conditions exist. Preferably, the trigger assembly 320 is positioned approximately halfway up the side of the stuffer chute 90 as best shown in FIG. 25 to accommodate most crops materials and conditions. However, the trigger assembly 320 may be slidably attached in a slot positioned along a portion of the length of the side of the stuffer chute 90 so that the trigger lever assembly 320 may be repositioned at times according to the crop materials being baled or the conditions. Also, preferably trigger assemblies 320 are positioned on both sidewalls of the stuffer chute 90 so that either may be triggered. The trigger assembly 320 senses the flake in the stuffer chute 90 and trips when the stuffer chute 90 is full or when the desired amount of flake is present and the flake is ready to be moved to the baling chamber 86. FIG. 26 shows the orientation of a trigger lever 340 of one embodiment of the trigger assembly 320 when the trigger lever 340 extends though an opening of a bracket 342 and into the interior of the stuffer chute 90 through an opening in the sidewall of the stuffer chute 90. Preferably, the trigger lever 340 extends approximately three to six inches into the interior of the stuffer chute 90 but the length of the trigger lever 340 may be adjusted to any suitable length to accommodate the crop and conditions. The trigger lever 340 is coupled to a spring 348 to bias the distal end of the trigger lever 340 pivoting about axis 344 into the opening in the sidewall of the stuffer chute 90. The size of the spring 348 may determine the size of the charge.

Figure 27:
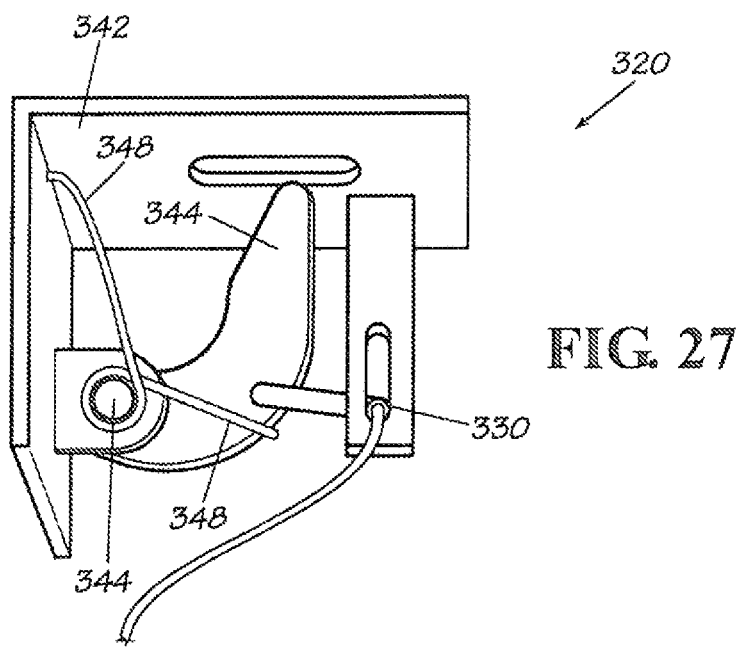
FIG. 27 illustrates the trigger assembly of FIG. 26 when the trigger assembly has been tripped.

FIG. 27, on the other hand, shows the orientation of the trigger lever 340 when the trigger assembly 320 has been tripped. A predetermined force of the flake upon the distal end of the trigger lever 340 inside the stuffer chute 90 causes the trigger lever 340 to pivot such that a greater portion of the trigger lever 340 extends to the exterior of the stuffer chute 90 where the trigger lever 340 comes into contact with a position sensor or contact switch 330 of the trigger assembly 320. When sensor/switch 330 is closed the circuit is completed to an electronic solenoid, hydraulic cylinder, actuator or motor 340 of the stuffer clutch assembly 310. Preferably a continuously variable analog position sensor would allow intelligent timing so that the stuffer can be tripped at the closest position to the set point instead only after the set point had been passed.

Movement initiated by the trigger assembly 320 and the completing of the circuit, such as the rotation of the motor 340, trips the linkage of the stuffer clutch assembly 310. The linkage of the stuffer clutch assembly 310 includes a first arm 350 coupled at one end to the motor 340. Coupled to the first arm 350 is a second arm 354. The second arm 354 pivots at point 356. The first and second arms 350, 354 are coupled together with a pin 360 in one of the first and second arms 350, 354 which is received in and slidably engages a slot 362 in the other of the arms 350, 354 so that a range of motion is provided to prevent the motor 340 from binding. A spring 366 in coupled between the distal end of first arm 350 and a point in between the pivot 356 and the position along the length of the second arm 354 where the pin 360 engages the slot 362. In the home position of the stuffer clutch assembly 310, a notch 370 on an end of a trip arm 372 receives and retains a roller 374 on the distal end of second arm 354. When the trigger assembly 320 is tripped and the motor 340 is energized, the point at which the first arm 350 is coupled to the motor 340 begins to rotate and the roller 374 of second arm 354 is released from the notch 370 of trip arm 372. Another roller 378 at the opposite end of trip arm 372 then engages the inner diameter of a rotating sprocket 380. Preferably, one revolution of the motor 340 releases the roller 374 from the notch 370 so that the trip arm 372 engages the sprocket 380 which in turn rotates a clutch pawl 382 of the stuffer clutch assembly 310 to put a stuffer arm 384 in motion, and then returns the stuffer clutch assembly 310 to the home position with the roller 374 of arm 354 received in notch 370. In an alternative embodiment, a hydraulic cylinder may be used instead of the motor 340. The hydraulic cylinder can be extended in order to move the arms 350, 354 and release the roller 374 from the notch 370 of the trip arm 372.

Figure 28:
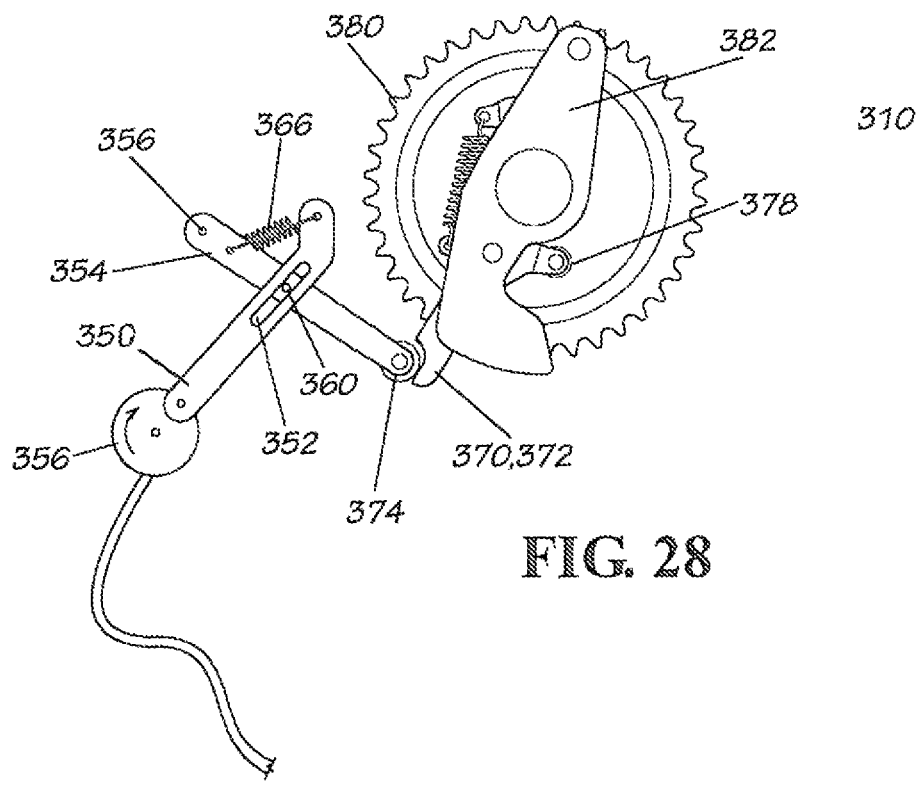
FIG. 28 illustrates the stuffer arm of a stuffer of the baler rotated into the home position.

In one or more embodiments, in order for the motor 340 to rotate, two conditions preferably are met. First, the stuffer arm 384 of the stuffer 280 must be in the home position as shown in FIG. 28. A contact switch or position sensor may be used to detect when the stuffer arm 384 is in the home position. Second, the trigger lever 340 in the sidewall of the stuffer chute 90 senses a charge in the stuffer chute 90 closing the switch 330 of the trigger assembly 320. When both of these conditions are net, the motor 340 turns allowing the roller 374 to drop off and fire the stuffer 280 one time. As soon as one of these two conditions is no longer met, the trip arm 372 goes back into a recessed position with its roller 374 retained in notch 370. Once the stuffer 280 leaves its home position, the motor 340 resets the stuffer clutch assembly 310 to neutral and awaits the next occurrence when both conditions are met again. After the stuffer 280 moves the flake to the baling chamber 86, the switch 330 of the trigger assembly 320 opens and is ready to sense the next flake formation. The electric tripping of the stuffer mechanism lends itself to finer control than the conventional mechanical linkages which is desirable when baling MOG or other material which easily may become an obstruction in the stuffer chute 90.

Referring to FIGS. 29-34, the combine 10 may include a chopper 410. The chopper 410 preferably is a crop residue or MOG chopper for receiving straw and other residue from the combine 10, and propelling or projecting it outward from the combine 10 as denoted by the trajectory path 420 by rotation of the chopper 410 as denoted by the rotation arrow 422. Referring to FIGS. 29-34, chopper 410 is distinguishable from conventional choppers because chopper 410 includes a dual knife 442 as described in detail below.

Figure 29:
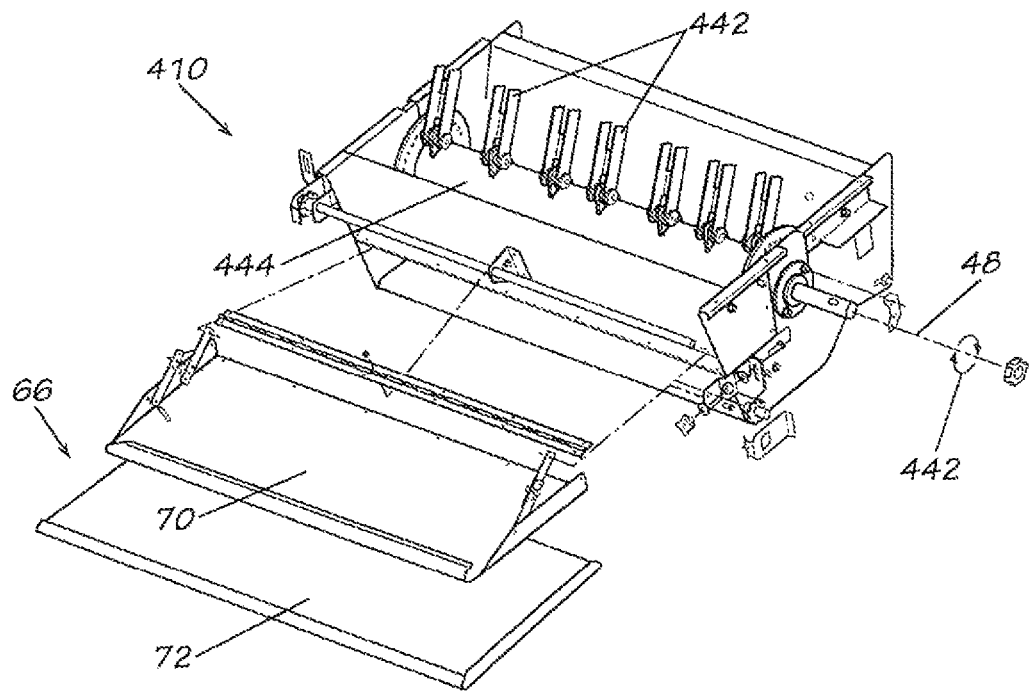
FIG. 29 is a top perspective view from the rear of part of the tailboard in combination with the chopper of the combine.
Figure 30:
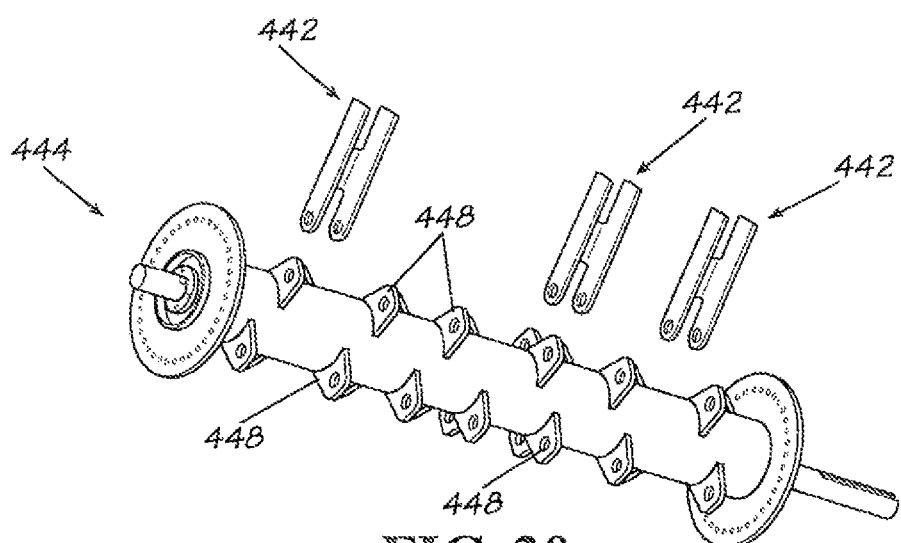
FIG. 30 is a perspective view of the rotor of the chopper with lugs for receiving a plurality a dual knives.

As best shown in FIGS. 29 and 30, the chopper 410 includes an elongated cylindrical rotor 444 supported within a housing of combine 10 for rotation in a predetermined rotational direction about a rotational axis extending longitudinally through rotor 444. Rotor 444 is supported for rotation by bushings, bearings, or the like, and is rotatable using a suitable rotatable power source, including, but not limited to, a belt or drive shaft connected to an engine of the combine 10, a hydraulic motor or the like. Rotor 444 includes an outer cylindrical surface having a plurality of brackets of mounting lugs 448 mounted thereon in preferably in two diametrically opposed helical arrays where each array extends the length of the rotor 444.

Figure 31:
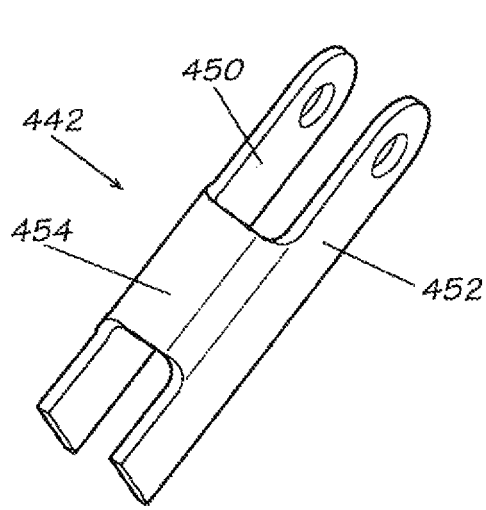
FIG. 31 is a perspective view of a dual knife.
Figure 32:
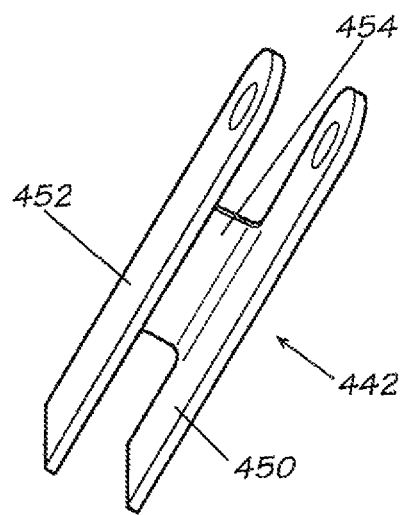
FIG. 32 is a perspective from of the dual knife of FIG. 31 from the opposite side.
Figure 33:
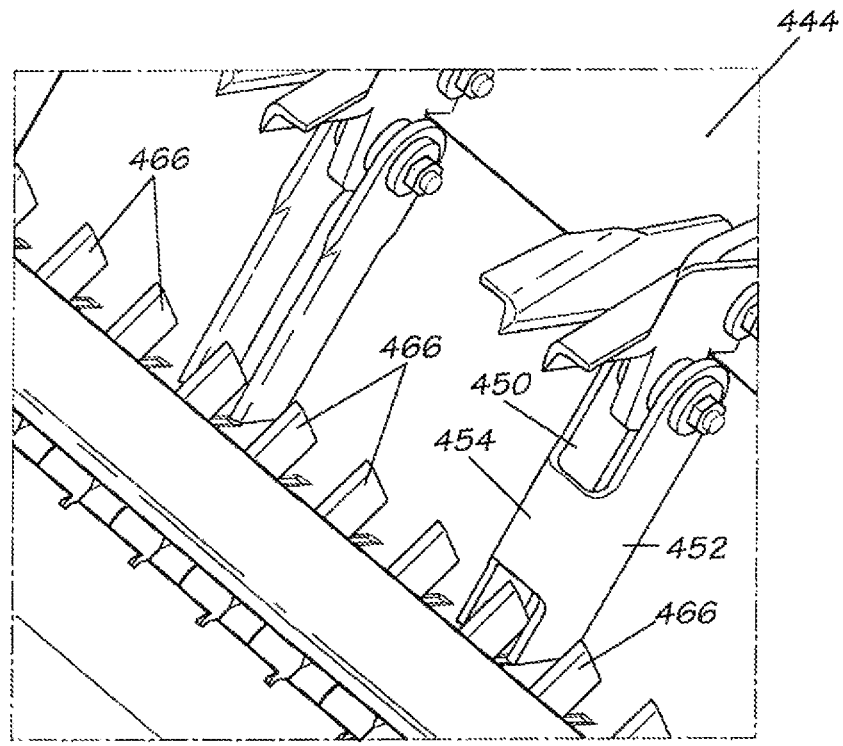
FIG. 33 is a partial view of the chopper illustrating stationary knives passing between knife portions of the dual knife.

As best shown in FIGS. 31 and 32, each dual knife 442 includes first and second knife portions 450, 452 with a web portion 454 in between each set of first and second knife portions 450, 452 connecting the first and second knife portions 450, 452 together. The sides of corresponding first and second knife portions 450, 452 are preferably parallel to one another. Each dual knife 442 is preferably made of sheet metal, blanked and formed into generally a U-shape. The dual knives 442 are preferably of a thickness greater than conventional knives because the dual knives 442 serve a dual purpose. The sheet metal may be at approximately ⅛ inches thick or greater with the edges of the knife portions 450, 452 not sharpened. The dual knives 442 may not only cut or chop the residue or MOG but the dual knives 442 may also impact MOG to eject the MOG from the chopper 410 and the combine 10 and then project the MOG to the baler 12. One or more dual knives 442 may be used in combination with other conventional knives within the same chopper 410 depending on the crop and crop conditions as shown in FIG. 33. The dual knives 442 may be used with many types of crops and materials such as corn cobs, soy bean and the like, and therefore, for example, the dual knives do not need to be changed between corn and soy beans.

Each knife portion 450, 452 has a proximal end or mounting end with an aperture therethrough for mounting the dual knifes 442 to the rotor 444 such that the dual knives 442 may be pivotally mounted to the rotor 444 in a spaced relationship to one another. Preferably, a lug 448 is received between a corresponding pair of knife portions 450, 452 of a dual knife 442 and mounted so that the dual knife 442 is free to swing as the rotor 444 rotates. Each knife portion 450, 452 also includes a distal end or free end. The web portion 454 preferably extends between a corresponding pair of knife portions 450, 452 and joins the corresponding pair of knife portions 450, 452 along bends which extend only partially along the lengths of an edge of each corresponding knife portion 450, 452. Preferably, the web portion 454 extends short of the proximal and distal ends of each corresponding knife portion 450, 452. The web portion 454 prevents the knife portions 450, 452 from deflecting, twisting, or tilting along their lengths from their mounting point with the lugs 448 on the rotor 444 as a result of impacting MOG such as corn cobs. The web portion 454 also creates air resistance and movement within the chopper 410 to facilitate conditioning of the material through the chopper 410.

The chopper 410 with one or more dual knives 442 may be operated at conventional speeds. However, the chopper 410 may also be run at reduced speeds in the range of approximately 700-1,100 rotations per minute, and preferably in a range of about 800-900 rotations per minute when lower speeds are desired based on the material and conditions, so that MOG such as corn cobs may be projected or paddled directly to the baler 12. The swinging dual knives 442 do not increase wear on the chopper 410 because the dual knives 442 are more robust than conventional knives. Also, the web portion 454, not only protects the knife portions 450, 452, but allows the chopper 410 to operate at lower rotations per minute and still attain the desired conditioning of the material as well as the desired velocity and trajectory when the MOG is projected toward the baler 12.

However, the chopper 410 may also be operated at a range of 1500-1600 rotations per minute and still project MOG such as corn cobs to the baler 12, brake or chop the corn cobs to attain the desired bale density, or still chop other materials such as soy beans. Therefore, over a wide range of operating speeds, the chopper 410 with one or more dual blades 442 optimally chops and discharges MOG to provide the desired conditioning to the many types of MOG as well as, when desired, provide the proper velocity and trajectory to the MOG to be received at the baler12.

Figure 34:
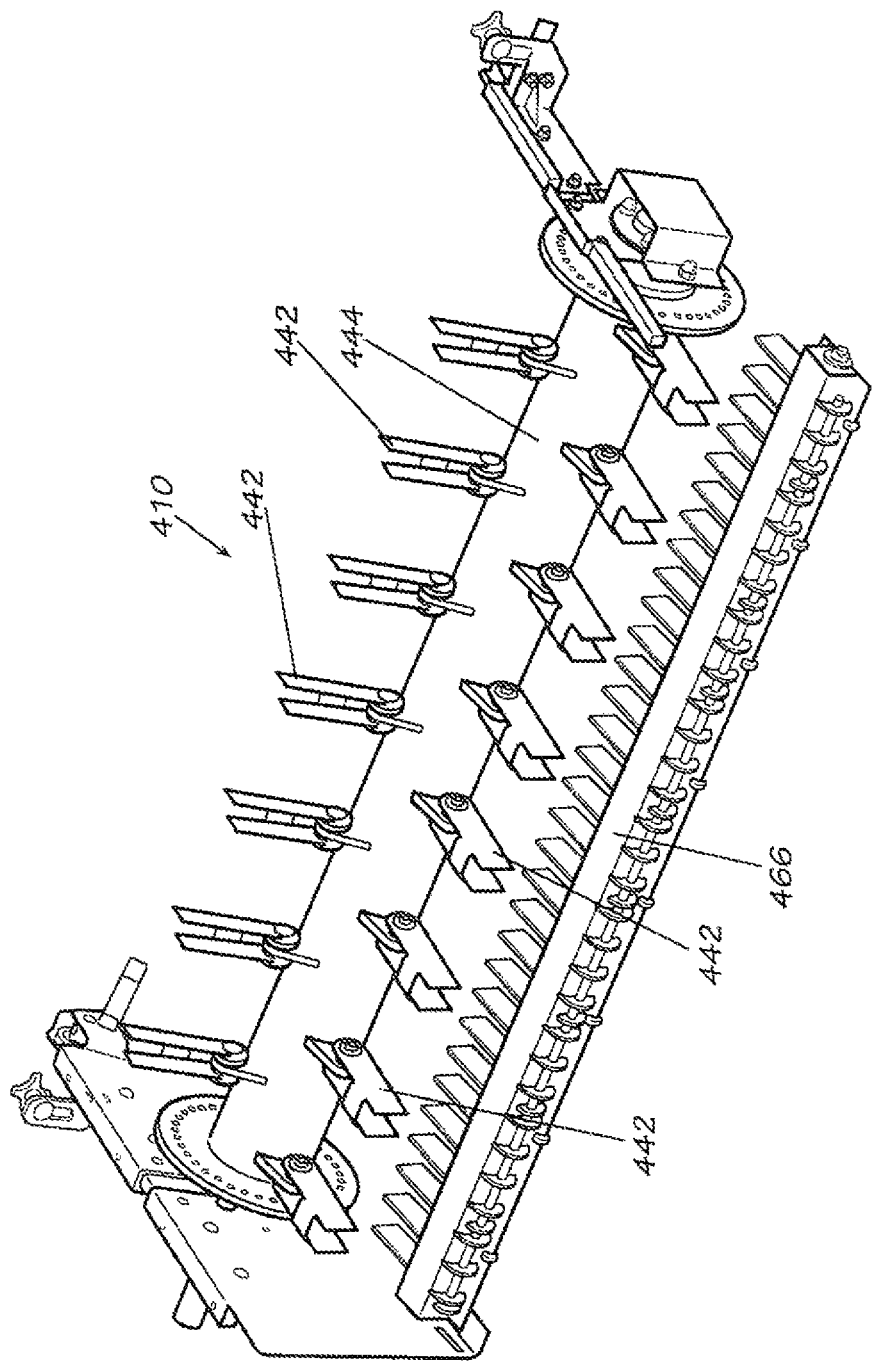
FIG. 34 is a perspective view of a plurality of stationary knives in a refracted position relative the rotor with the dual knives.

One or more dual knifes 442 and their corresponding knife portions 450, 452 cooperate with a plurality of stationary knives 466. The stationary knives 466 may be moved between a retracted position, as shown in FIG. 34, and an engaged position relative the dual knives 442 on the rotor 444. In the engaged position, as best shown in FIG. 33, a distal end of a stationary knife 466 passes in between the corresponding knife portions 450, 452 of a dual knife 442, without impacting the web portion 454 in order to provide at least a portion of chopped or cut MOG which will be projected toward the baler 12.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A baler, said baler comprising a transfer pan, a packer, and packing forks, said transfer pan comprising a surface at least partially defining a target for receiving material projected toward said baler without a conveyor to impact thereon, said packing forks operable to extend from said packer and transfer said material from said transfer pan surface toward said packer, wherein said baler further comprises a hydraulic motor and a fan powered by said hydraulic motor, said fan providing pressurized air, said transfer pan surface comprising plural apertures through which said pressurized air is provided to direct said material on said transfer pan toward said packer.

2. The baler of claim 1 wherein said transfer pan comprises a single contiguous surface that receives said material from another machine directly through the air and without said conveyor.

3. The baler of claim 1 wherein said packer is coupled to said transfer pan.

4. The baler of claim 1 wherein said transfer pan is adapted to bounce to absorb the impact of said material impacting said target.

5. The baler of claim 4 further comprising a stuffer chute adjacent said packer, wherein said packing forks are operable to transfer said material from said transfer pan to said stuffer chute.

6. The baler of claim 1 wherein said transfer pan surface is in slidable relationship to said material.

7. The baler of claim 1 wherein said transfer pan is coupled to said baler with chains to permit said transfer pan to bounce.

8. The baler of claim 1 wherein said transfer pan is coupled to said baler with springs to permit said transfer pan to bounce.

9. An agricultural system, comprising:
a combine; and
a baler towed by said combine, said baler comprising:
  a packer;
  packing forks;
  a hydraulic motor;
  a fan powered by said hydraulic motor, said fan providing pressurized air; and
  a transfer pan disposed adjacent said packer, said transfer pan comprising a surface at least partially defining a target for receiving material projected from said combine directly to said baler, without a conveyor, to impact said transfer pan surface thereon, said packing forks operable to transfer said material from said transfer pan surface to a stuffer chute adjacent said packer,
wherein said transfer pan surface comprises plural apertures through which said pressurized air is provided to direct said material on said transfer pan toward said packer.

10. The agricultural system of claim 9 wherein said combine comprises a chopper and chaff spreader disposed at the rear of said combine, wherein said transfer pan is positioned to collect both crop material from said chopper and chaff from said chaff spreader.

11. The agricultural system of claim 9, wherein said combine is configured to project to said transfer pan material other than grain.

12. The agricultural system of claim 9, wherein said transfer pan surface is fixed, said material sliding on said surface to be conveyed toward said packer.

13. A collector coupled to a baler having a packer and a fan powered by a hydraulic motor and operative to provide a flow of pressurized air to said collector, said collector comprising:
  a transfer pan at least partially defining a target, said transfer pan operative to receive material projected toward said baler unobstructed over air from the rear of a combine to impact said target thereon, said transfer pan having an upper crop material collection surface and plural apertures defining plural openings in said collection surface, said plural apertures positioned to direct the flow of pressurized air outwardly through said plural openings in said collection surface to urge at least a portion of said material impacting said transfer pan toward a packer of said baler.

* * * * *